(12) United States Patent  (10) Patent No.: US 8,674,710 B2
Satake et al.  (45) Date of Patent: Mar. 18, 2014

(54) CAPACITIVE OCCUPANT DETECTION APPARATUS

(75) Inventors: Masayoshi Satake, Okazaki (JP); Hiroyuki Mori, Obu (JP); Kouji Ootaka, Toyohashi (JP); Hajime Nakagawa, Nagoya (JP); Toshihiro Hattori, Okazaki (JP); Noboru Maeda, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 328 days.

(21) Appl. No.: 13/306,168

(22) Filed: Nov. 29, 2011

(65) Prior Publication Data

US 2012/0161793 A1 Jun. 28, 2012

(30) Foreign Application Priority Data

Nov. 30, 2010 (JP) .................................. 2010-267121
Oct. 31, 2011 (JP) .................................. 2011-239081

(51) Int. Cl.
*G01R 27/26* (2006.01)
(52) U.S. Cl.
USPC ........................... 324/688; 324/686; 324/658
(58) Field of Classification Search
USPC ............ 324/658, 649, 600, 686, 661, 750.17, 324/688, 660, 679
See application file for complete search history.

(56) References Cited

U.S. PATENT DOCUMENTS

| 7,271,730 | B2 | | 9/2007 | Kimura et al. | |
|---|---|---|---|---|---|
| 8,269,512 | B2 | * | 9/2012 | Ootaka | 324/686 |
| 8,570,055 | B2 | * | 10/2013 | De Boer et al. | 324/686 |
| 2003/0141881 | A1 | * | 7/2003 | Mallory | 324/658 |
| 2006/0284731 | A1 | * | 12/2006 | Ando et al. | 340/561 |
| 2008/0100425 | A1 | | 5/2008 | Kiribayashi | |
| 2009/0295410 | A1 | * | 12/2009 | Sakamaki | 324/658 |
| 2010/0315100 | A1 | | 12/2010 | Yamanaka et al. | |
| 2011/0163763 | A1 | * | 7/2011 | Osaki et al. | 324/658 |
| 2011/0193574 | A1 | * | 8/2011 | De Boer et al. | 324/688 |
| 2011/0254572 | A1 | * | 10/2011 | Yamaguchi et al. | 324/688 |
| 2011/0285408 | A1 | * | 11/2011 | Satake et al. | 324/679 |

FOREIGN PATENT DOCUMENTS

JP 2009-174978 8/2009

* cited by examiner

*Primary Examiner* — Hoai-An D Nguyen
(74) *Attorney, Agent, or Firm* — Harness, Dickey & Pierce, PLC

(57) ABSTRACT

A capacitive occupant detection apparatus comprising a sensor unit and a control unit is disclosed. The sensor unit includes a detection electrode and a periphery guard electrode. The control unit includes: a signal application circuit for applying an oscillation signal to the detection electrode; an operational amplifier for applying to the guard electrode a signal having the same phase and potential as the oscillation signal applied to the detection electrode; and a control circuit for receiving current and voltage values supplied to the detection and for determining a mounting state on a seat based on the inputted current and voltage values (including phase information). The periphery guard electrode is located to surround the detection electrode when viewed from an upper side of the detection electrode.

19 Claims, 24 Drawing Sheets

CAPACITIVE OCCUPANT DETECTION APPARATUS

CROSS REFERENCE TO RELATED APPLICATION

The present application is based on and claims priority to Japanese Patent Applications No. 2010-267121 filed on Nov. 30, 2010 and No. 2011-239081 filed on Oct. 31, 2011, disclosures of which are incorporated herein by reference.

TECHNICAL FIELD

The present disclosure relates to a capacitive occupant detection apparatus.

BACKGROUND

Conventionally, various types of capacitive occupant detection apparatus have been proposed (for example, see patent document 1: JP-2008-111809A corresponding to US2008/0100425A). As a related art, a capacitive occupant detection apparatus illustrated in FIGS. 40A and 40B will be described. In this capacitive occupant detection apparatus, a detection electrode 91 is placed in an inside of a seat 90 of a vehicle, and a guard electrode 92 is placed on a lower side of the detection electrode 91. A sinusoidal signal is applied to the detection electrode 91 to generate an electric field therearound, and a value of an electric current of the sinusoidal signal, which changes under influence of a conductive body and/or a dielectric body (e.g., a human body) located around the detection electrode 91, is detected. Then, according to this detection result, a detected capacitance or the like is computed, and it is determined whether an occupant on the seat 90 is an adult 93 or a child 94 on a child-restraint system (CRS).

According to the above related art, however, the electric field generated from the electrode 91 is directly coupled not only with a detection target (adult or child) 93, 94 but also with a conductive body 97 (vehicle body), which corresponds to a region surrounded by the dashed-line 95, 96. Thereby, the detected capacitance is increased by the amount corresponding to this direct coupling.

FIG. 41 illustrates capacitance components C1, C2 in each detected capacitance for different types of seated occupant. The capacitance C1 is the capacitance through the human body, and the capacitance C2 is the capacitance (direct coupling capacitance) increased by the direct coupling (i.e., direct coupling capacitance).

As shown in FIG. 41, since the child on the CRS covers a small area of the electrode 91, the child on the CRS causes larger the direct coupling capacitance C2 than the seated adult. Therefore, when the presence of a cushion between the adult and the seat and/or occupant's thick cloth(es) increases a distance between the electrode 91 and the body of the adult on the seat, the capacitance C1 becomes smaller even if the occupant is the adult. As a result, it becomes difficult to determine whether the occupant on the seat is the adult or the child on the CRS. This difficulty associated with the determination based on the direct coupling capacitance C2 can apply to not only a determination as to whether the occupant is the adult or the CRS but also a general determination as to a mounting state on a seat.

Patent Document 2 (JP-2010-286390A) describes a capacitive occupant detection apparatus in which a detection electrode (main electrode) is formed on a film board. The detection electrode is for detection of a capacitance to a human body serving as a detection target, and is connected to a control unit. The control unit has a function to measure the capacitance and perform an occupant determination. For reduction of cost or the number of part, the detection electrode is stretched thin and configured into a wire portion, so that the wire portion serves as a substitute for a harness that connects the detection electrode and the control unit.

The above connection manner, however, creates an unwanted capacitive coupling between the wire portion and the detection target or between the wire portion and the ground.

SUMMARY

In view of the foregoing, it is an object of the present disclosure to provide a capacitive occupant detection apparatus that can suppress a capacitive coupling to objects other than a detection target, and that can improve accuracy of determination as to a mounting state on a seat. It is a second object of the present disclosure to provide a capacitive occupant detection apparatus that can suppress a capacitive coupling between a wire portion and a detection target or between the wire portion and a ground when a detection electrode and a control unit are connected via the wire portion.

According to a first example of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes a detection electrode and a guard electrode. The guard electrode includes a periphery guard part. The control unit includes: a signal application circuit that applies a main signal to the detection electrode and applies a periphery guard signal to the periphery guard part; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The periphery guard part is located away from the detection electrode when the detection electrode is viewed from the detection target.

According to the above configuration, since the periphery guard part located to surround the detection electrode is used as the guard electrode, it is possible to suppress a direct coupling between the detection electrode and a vehicle body, and as a result, it is possible to improve accuracy in determination as to the mounting state on the seat.

According to a second example of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes: a detection electrode; a detection electrode wire portion serving as a wire through which the detection electrode and the control unit are connected to each other; and a periphery guard wire portion. The control unit includes: a signal application circuit that applies a main signal to the detection electrode through the detection electrode wire portion and applies a periphery guard signal to the periphery guard wire portion; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The periphery guard wire portion is located away from the detection electrode wire portion when the detection electrode is viewed from the detection target.

According to the above configuration, since the periphery guard wire portion is located away from the detection electrode wire portion when the detection electrode is viewed from the detection target, it is possible to suppress a capacitive coupling between the detection electrode wire portion and the detection target or between the detection electrode wire portion and the ground.

According to a third example of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes: a detection electrode; a detection electrode wire portion serving as a wire through which the detection electrode and the control unit are connected to each other; a back surface guard electrode located on an opposite side of the detection electrode from the detection target and located opposing the detection electrode; and a front surface guard wire portion. The control unit includes: a signal application circuit that applies a main signal to the detection electrode through the detection electrode wire portion, applies a back surface guard signal to the back surface guard electrode and applies a front surface guard signal to the front surface guard wire portion; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The front surface guard wire portion is located on an opposite side of the detection electrode from the back surface guard electrode and is located opposing the detection electrode wire portion.

According to the above configuration, since the front surface guard part located on the opposite side of the detection electrode from the rear surface guard electrode and located opposing the detection electrode wire portion is present, it is possible to suppress a capacitive coupling between the detection electrode wire portion and the detection target or between the detection electrode wire portion and the ground.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
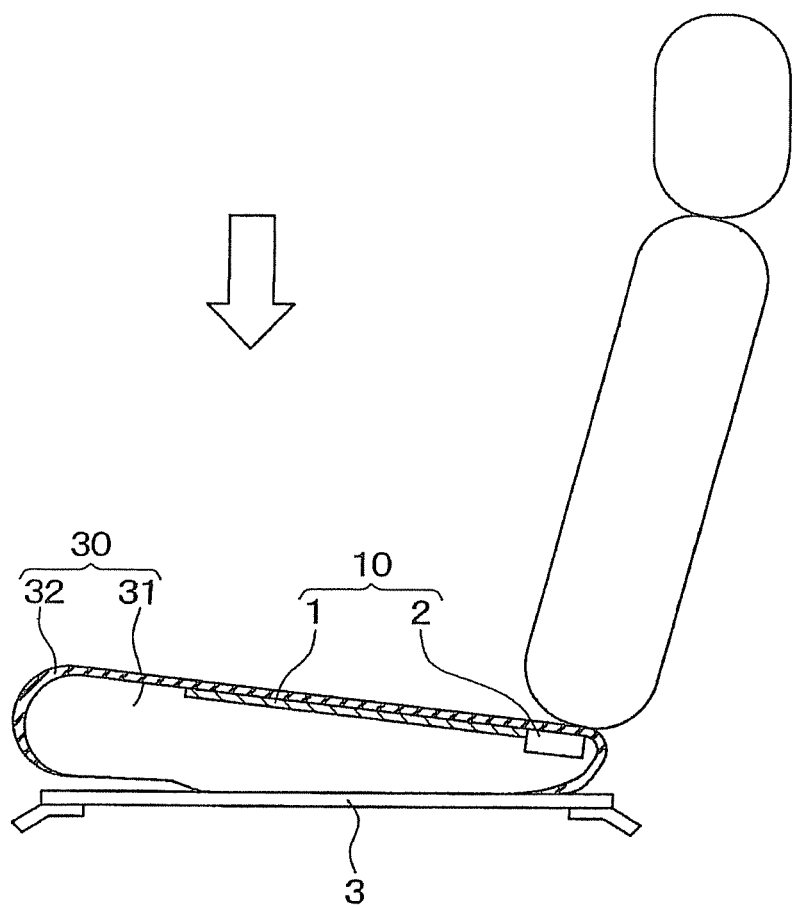
FIG. 1 is a diagram illustrating a capacitive occupant detection apparatus installed in a vehicle.

A first embodiment will be described below. FIG. 1 illustrates a capacitive occupant detection apparatus 10 installed in a vehicle in accordance with the present embodiment. This capacitive occupant detection apparatus 10 is installed in the vehicle, determines a type of occupant seated on a seat (e.g., a front passenger seat, a rear seat etc.) of the vehicle, and determines whether or not the seat is wet.

As shown in FIG. 1, the capacitive occupant detection apparatus 10 includes a sensor unit 1 and a control unit 2. The sensor unit 1 is a film member, which is configured into a plate form and has electrodes to sense the occupant who is present on the seat (e.g., the front passenger seat, the rear seat etc.) of the vehicle. The sensor unit 1 is placed in an inside of a seat base 30 of the seat. More specifically, the sensor unit 1 is bonded to a seat cushion 31 at a location between the seat cushion 31 and a seat cover 32 in the seat base 30.

As shown in FIG. 1, the control unit 2 may be placed immediately below a seat back part of the seat or may be placed at an outside of the seat. The control unit 2 is connected to an on-vehicle device (not shown) such as an air-bag ECU and the like through a sub-harness. An air-bag, an air-bag ON lamp and an air-bag OFF lamp are connected to the air-bag ECU.

Figure 2:
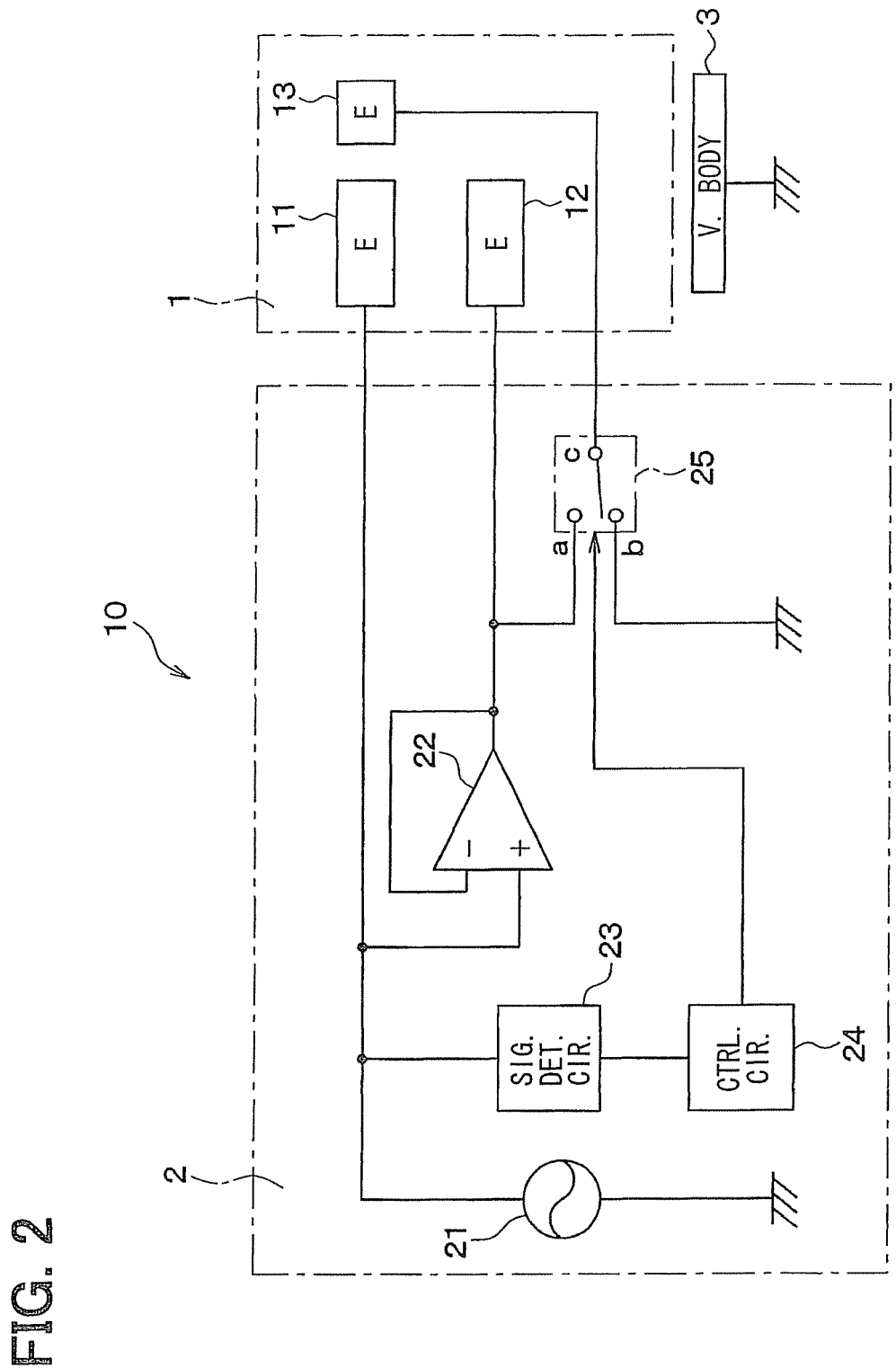
FIG. 2 is a diagram illustrating a circuit configuration of a capacitive occupant detection apparatus.

FIG. 2 shows a circuit configuration of the capacitive occupant detection apparatus 10. The sensor unit 1 includes a detection electrode 11, a back surface guard electrode 12 and a periphery guard wet electrode 13. Details of the structure of the sensor unit 1 will be described with reference to FIG. 3 to 6.

Figure 3:
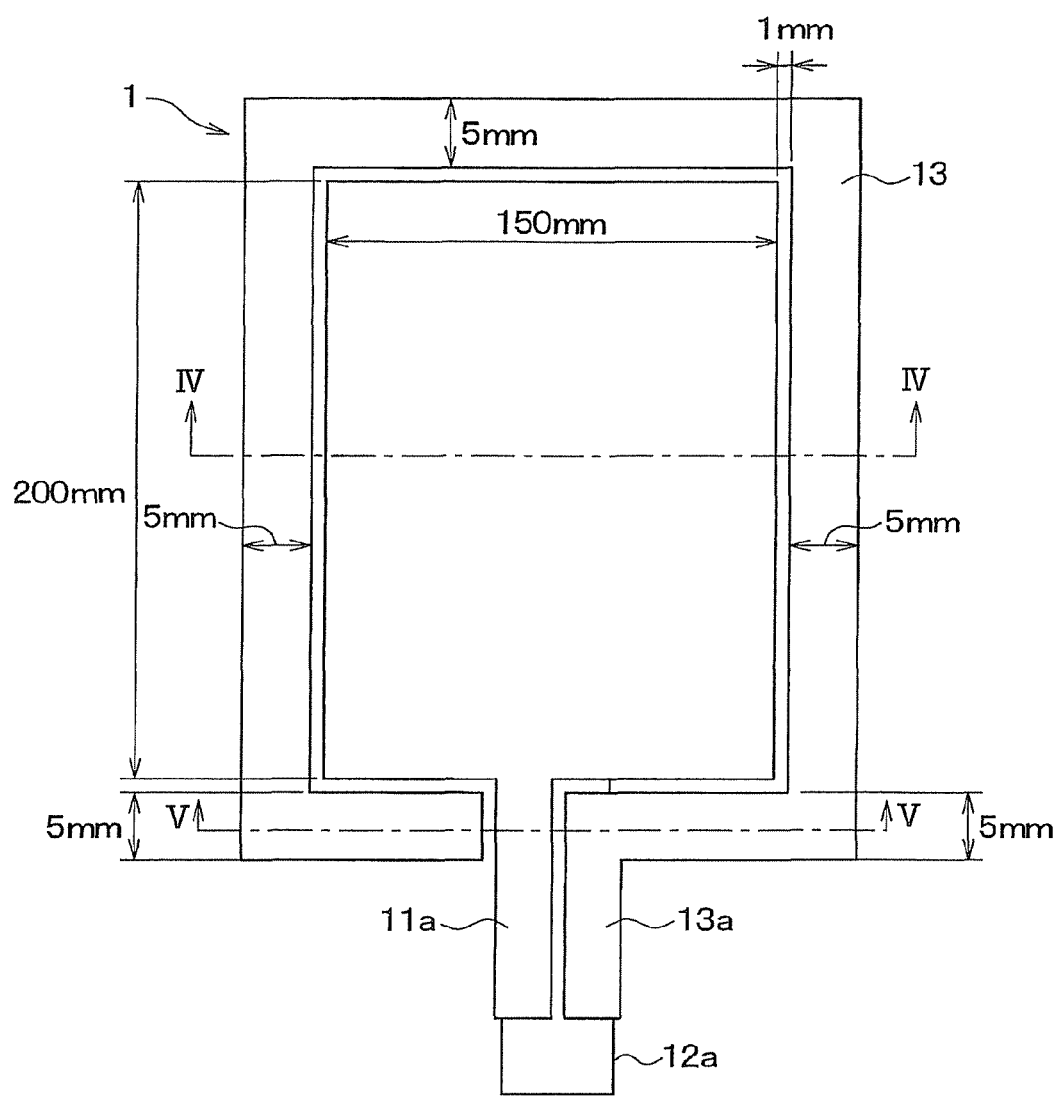
FIG. 3 is a diagram illustrating an arrangement of electrodes.
Figure 4:
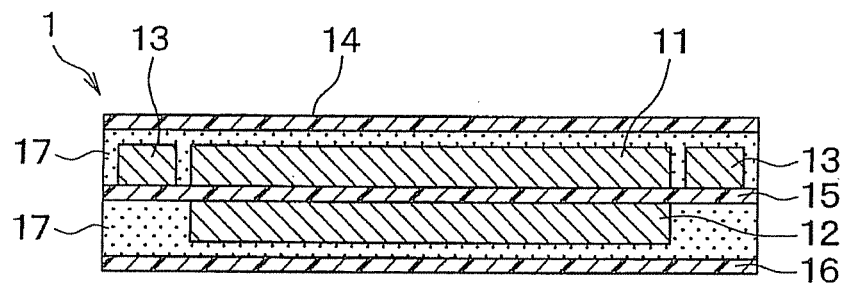
FIG. 4 is a cross-sectional view of a sensor unit taken along line IV-IV in FIG. 3.
Figure 5:
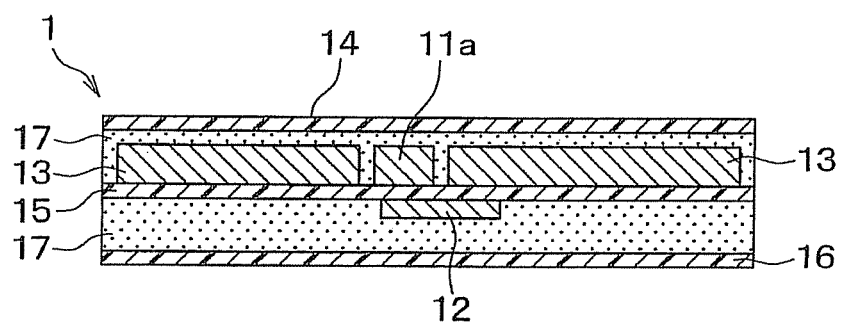
FIG. 5 is a cross-sectional view of a sensor unit taken along line V-V in FIG. 3.
Figure 6:
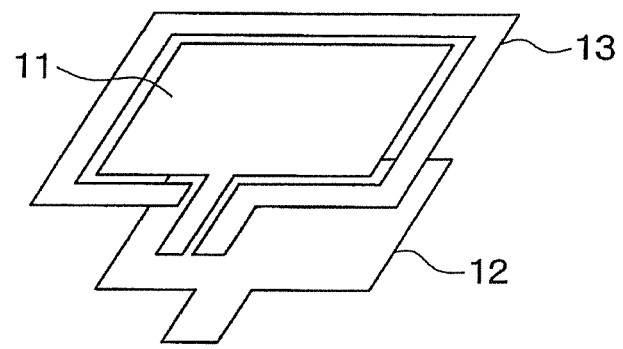
FIG. 6 is a perspective view for illustrating a two-layered structure of electrodes.

FIG. 3 illustrates the sensor unit 1 that is installed to the seat base 30 and is viewed from an upper side (i.e., detection target side) of the sensor unit 1 (viewed in a direction of an arrow in FIG. 1). FIG. 3 shows an arrangement of the detection electrode 11, the back surface guard electrode 12 and the periphery guard wet electrode 13 while eliminating the seat base 30 and the other components of the sensor unit 1 for the sake of simplicity. The upper side of FIG. 3 corresponds to a front side of the seat (a left side in FIG. 1). Furthermore, FIGS. 4 and 5 are cross-sectional views taken along line IV-IV and line V-V in FIG. 3, respectively. FIG. 6 is a perspective view for illustrating a two-layered structure of the detection electrode 11, the back surface guard electrode 12 and the periphery guard wet electrode 13. A thickness of the sensor unit 1 (a length in a top-to-bottom direction in FIG. 4, FIG. 5) is thin, e.g., about 250 μm. In FIGS. 3 to 5, the thickness of the sensor unit 1 is exaggerated from the actual size for purpose of improving the visibility. The same also applies to FIG. 11, 12, 16.

As shown in FIG. 3, the detection electrode 11 of the sensor unit 1 is a plate-shaped film member. The detection electrode 11 has a shape (e.g., a rectangular shape with 200 mm in the front-to-rear direction and 50 mm in the left-to-right direction) so that the detection electrode 11 can be placed between the seat cover 32 and the seat cushion 31 of the seat.

The periphery guard wet electrode 13 is shaped into a quadangular frame (with a width of, for example, 4 mm) so that the quadangular frame has a cutout. When the sensor unit 1 is viewed from the upper side, the periphery guard wet electrode 13 is located in the surrounding of the detection electrode 11 and spaced apart form the detection electrode 11 (a gap of approximately 1 mm for example) so as to surround almost entire periphery of the detection electrode 11. When the seat base 30 is viewed from the upper side, the periphery guard wet electrode 13 and the detection electrode 11 do no overlap with each other, and thus, the periphery guard wet electrode 13 and the back surface guard electrode 12 do not overlap with each other.

The back surface guard electrode 12 has the same size and shape as the detection electrode 11. The back surface guard electrode 12 is located on a lower side of the detection electrode 11 (a far side in FIG. 3), and spaced apart from and opposing the detection electrode 11. Thus, in FIG. 3, the back surface guard electrode 12 is hidden by the detection electrode 11 and is invisible. Each electrode 11, 12, 13 is formed of an electrically-conductive carbon. Alternatively, a part of each electrode 11, 12, 13 may be made of silver. Alternatively, each electrode 11, 12, 13 as a whole may be made of another electrically-conductive material.

In order to configure these electrodes 11 to 13 as a single plate-shaped-mat, the sensor unit 1 further includes a first film 14, a second film 15, a third film 16 and an adhesive 17, as shown in FIGS. 4 and 5.

The films 14, 15, 16 are plate-shaped and electrically-insulating films that are sized to such an extent that the films 14, 15, 16 can cover the electrodes 11, 12, 13. For example, the films 14, 15, 16 are made of PEI (polyethylene terephthalate). The films 14, 15, 16 are layered and stacked from the top in this order. The detection electrode 11 and the periphery guard wet electrode 13 are arranged as a first layer between the first film 14 and the second film 15. The back surface guard electrode 12 is arranged as a second layer between the second film 15 and the third film 16.

These members 11 to 16 are bonded by the adhesive 17 filling in the first layer and the second layer. Since this adhesive 17 is made of an electrically insulating material, the detection electrode 11 and the periphery guard wet electrode 13 are electrically insulated from each other.

A detection electrode wire portion 11a is made of the same material as the detection electrode 11. The detection electrode wire portion 11a and the detection electrode 11 are formed as a single piece. The detection electrode wire portion 11a extends from the cutout portion of the periphery guard wet electrode 13 toward the rear side of the seat base 30 (in a middle-to-lower direction in FIG. 3). The back surface guard wire portion 12a is made of the same material as the back surface guard electrode 12. The back surface guard wire portion 12a and the back surface guard electrode 12 are formed as a single piece. The back surface guard wire portion 12a extends toward the rear side of the seat base 30 (the middle-to-lower direction in FIG. 3). The periphery guard wire portion 13a is made of the same material as the periphery guard wet electrode 13. The periphery guard wire portion 13a is connected to an end of the periphery guard wet electrode 13. The periphery guard wire portion 13a and the periphery guard wet electrode 13 are formed as a single piece. The periphery guard wire portion 13a extends toward the rear side of the seat base 30 (the middle-to-lower direction in FIG. 3). Because of this, the back surface guard wire portion 12a and the detection electrode wire portion 11 oppose each other.

As describe above, the detection electrode 11 and the periphery guard wet electrode 13 are placed in the same first layer. The back surface guard electrode 12 is placed in the second layer. The detection electrode wire portion 11a extends from the cutout portion of the periphery guard wet electrode 13. Thus, the wire portion 11a, 12a, 13a can be put away from the sensor unit 1 (see FIG. 6) without interfering with other connectors 11a, 12a, 13a.

These wire portions 11a, 12a, 13a are connected to the control unit 2. Through these wire portion 11a, 12a, 13a, the electrodes 11, 12, 13 are connected to the control unit 2. Specifically, the wire portions 11a, 12a, 13a are shaped and configured as extensions of the electrodes 11, 12, 13, so that the wire portions 11a, 12a, 13a serve as wires through which the electrodes 11, 12, 13 are connected to the control unit 2, respectively.

The control unit 2 includes a signal application circuit 21, a guard potential usage operational amplifier 22, a signal detection circuit 23, a control circuit 24, and a changeover switch 25.

The signal application circuit 21 is a circuit for applying a main signal (oscillation signal), voltage of which changes cyclically, to the detection electrode 11 via the detection electrode wire portion 11a. For example, an AC power supply circuit for applying an AC signal to the detection electrode 11 can be used.

The guard potential usage operational amplifier 22 (corresponding to an example of guard potential usage circuit) functions as a voltage follower. The + input terminal of the guard potential usage operational amplifier 22 is connected to a signal line connecting the signal application circuit 21 to the detection electrode 11. The output terminal of the guard potential usage operational amplifier 22 is connected to a terminal "a" of the changeover switch 25 and is connected the back surface guard electrode 12 through the wire portion 11b. The guard potential usage operational amplifier 22 applies a guard signal, which has the same phase and electric potential as the oscillation signal applied to the detection electrode, to the back surface guard electrode 12 and the terminal "a" of the changeover switch 25.

At the time when the oscillation signal is applied, the signal detection circuit 23 detects a time-varying value of current supplied from the signal application circuit 21 to the detection electrode 11 and a time-varying value of voltage supplied from the signal application circuit 21 to the detection electrode 11. For this circuit, any type of known circuit may be used.

The control circuit 24, which may be configured as a known microcomputer, includes a CPU, a RAM, a ROM and the like. The CUP executes a program in ROM, thereby implementing the below-described processing. The time-varying current value and voltage value detected with the signal detection circuit 23 are inputted to this control circuit 24.

In accordance with control of the control circuit 24, the changeover switch 25 switches between a first state where the terminal "a" and the terminal "b" are connected and a second state where the terminal "b" and the terminal "c" are connected. The terminal "b" is grounded. The terminal "c" is connected to the periphery guard wet electrode 13 through a wire portion 13c. Thus, in the first state, the back surface guard electrode 12 and the periphery guard wet electrode 13 are electrically connected to each other. In the second state, the back surface guard electrode 12 and the periphery guard wet electrode 13 are not electrically connected to each other, and the periphery guard wet electrode 13 is grounded.

Operation of the capacitive occupant detection apparatus 10 having the above-described configuration will be described. While a main power (IG or the like) is ON, the signal application circuit 21 always outputs the oscillation signal to the detection electrode 11 through the detection electrode wire portion 11a. Additionally, the control circuit 24 of the control unit 2 executes a program stored in the ROM, thereby alternately switching between an occupant detection mode and a wet detection mode.

First, the occupant detection mode will be described. In the occupant detection mode, the control circuit 24 switches the changeover switch 25 into the first state. Accordingly, the back surface guard electrode 12 and the periphery guard wet electrode 13 are electrically connected to each other. As a result, the guard signal that has the same phase and electrical potential as the oscillation signal applied to the detection electrode 11 is also applied to the periphery guard wet electrode 13 through the periphery guard wire portion 13a. The guard signal applied to the back surface guard electrode 12 in the occupant detection mode is called a back surface guard signal. The guard signal applied to the periphery guard wet electrode 13 in the occupant detection mode is called a periphery guard signal. Therefore, the periphery guard wet electrode 13 and the back surface guard electrode 12 together function as a periphery guard electrode.

In the occupant detection mode, the control circuit 24 further calculates impedance from the detection electrode 11 to the vehicle body 3 by using a voltage amplitude value, a current amplitude value and a phase difference between the current and the voltage, based on the time-varying current value and voltage value (which include information on voltage phase and current phase) that are detected with the signal detection circuit 23 in the first state. Since an electrostatic capacitance can be determined from reciprocal of imaginary part of impedance, the occupant determination is performed based on the imaginary part of the calculated impedance. For example, when the imaginary part of the impedance is smaller than an occupant detection threshold A, it is determined that the occupant is an adult. When the imaginary part of the impedance is larger than the occupant detection threshold A, it is determined that the occupant is a child on a CRS.

Alternatively, it is possible to determine an occupant from only the detected current value. For example, when the detected current value is larger than a predetermined occupant detection threshold B, it is determined that the occupant is an adult. When the detected current value is smaller than the predetermined occupant detection threshold B, it is determined that the occupant is a child on a CRS.

Figure 7A:
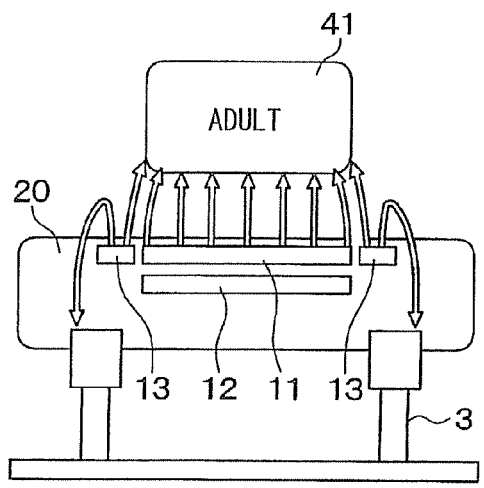
FIG. 7A and FIG. 7B are diagrams each illustrating lines of electrical force extending from a detection electrode and a periphery guard wet electrode in an occupant detection mode.
Figure 7B:
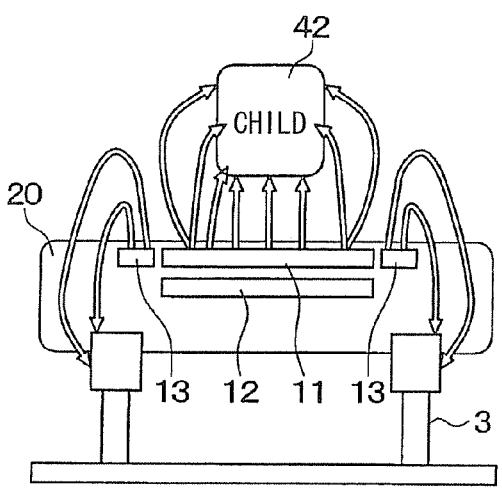
Figure 40A:
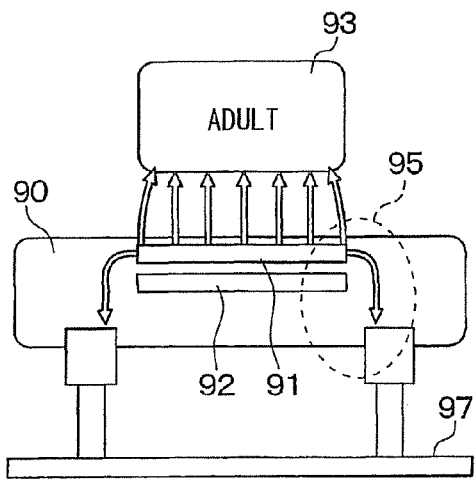
FIG. 40A and FIG. 40B are diagrams each illustrating a configuration and operation of a capacitive occupant detection apparatus of the related art.
Figure 40B:
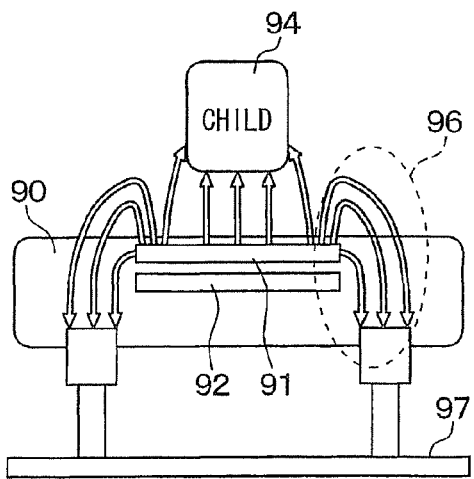

As schematically illustrated in FIG. 7A and FIG. 7B, in both cases where an adult 41 is seated on the seat base 30 (see FIG. 7A) and a child 42 on the CRS is on the seat base 30, lines of electric force coming from the detection electrode are concentrated in the occupant 41, 42 under the influence of lines of electric force that are generated in response to a guard driving of the back surface guard electrode 12 and the periphery guard wet electrode 13. As a result, a less amount of the lines of electric force coming from the detection electrode is leaked into the vehicle body as compared with the related art (see FIGS. 40A, 40B). Therefore, the direct coupling between the detection electrode 11 and the vehicle body 3 can be suppressed.

Figure 41:
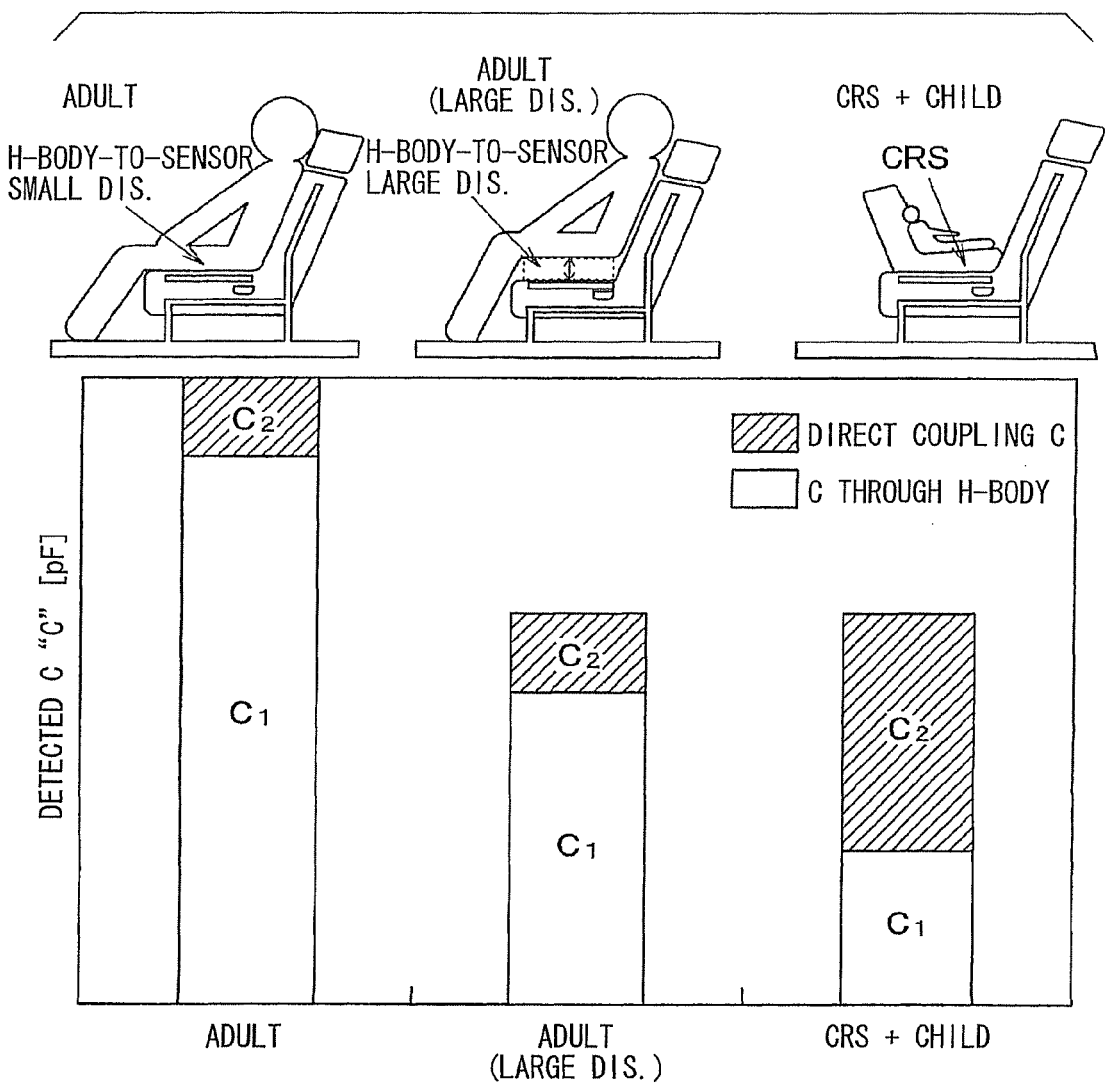
FIG. 41 is a diagram illustrating details C1, C2 of a capacitance detected by a capacitive occupant detection apparatus of the related art.

In this case, since the electrostatic capacitance detected with the detection electrode 11 is an electrostatic capacitance of almost only the human body, the C2 component in FIG. 41 remarkably decreases. Accuracy of determination as to whether the occupant seated on the seat is an adult or a child on the CRS becomes high. That is, the determination performance in the occupant detection mode improves.

Figure 8:
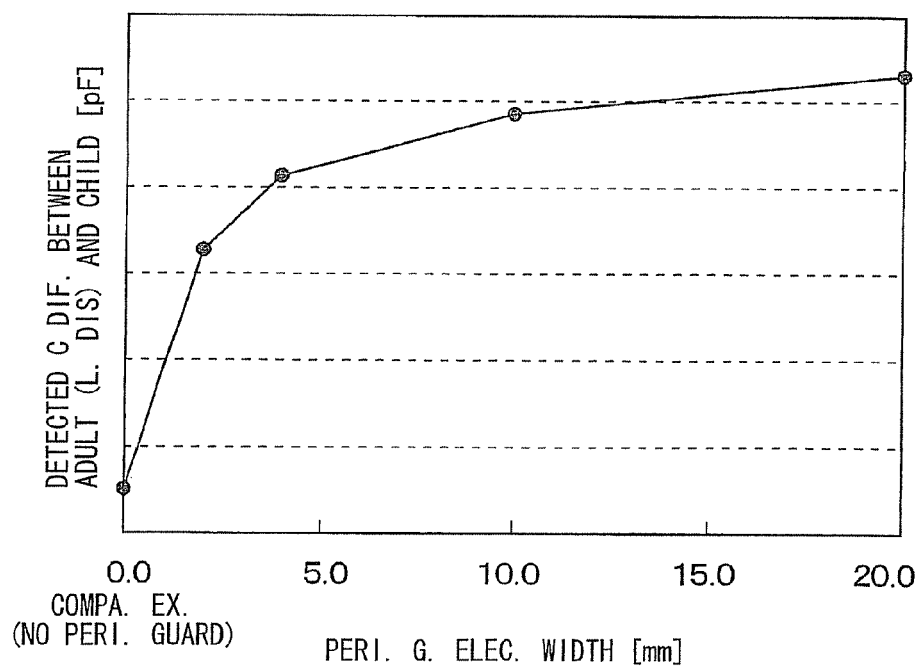
FIG. 8 is a diagram illustrating a result of experiment on detection of an electrostatic capacitance difference for various widths of a periphery guard wet electrode.

FIG. 8 illustrates a difference in detected electrostatic capacitance between when the adult is seated on the seat base 30 so as to be spaced 20 mm apart from the detection electrode 11 and when the child is seated on the CRS attached on the seat base 30. FIG. 8 shows that cases where the detected electrostatic capacitance difference in various widths of the periphery guard wet electrode 13 of the capacitive occupant detection apparatus 10 of the present embodiment is changed into various values.

As shown in this figure, when the periphery guard wet electrode 13 is present, the electrostatic capacitance difference is larger than when the width of the periphery guard wet electrode 13 is zero (i.e., the periphery guard wet electrode 13 is absent). In particular, for the width less than 4 mm, the electrostatic capacitance difference sharply increases with increasing width. For the width larger than 4 mm, the electrostatic capacitance difference gently increases with increasing width. Thus, as for the width of the periphery guard wet electrode 13, any width can achieve the advantage to some extent; however, the width of 4 mm or more is preferable.

The same experiments using the detection electrode 11 having other shapes than the quadangular shape with 150 mm×200 mm were conducted. In these cases also, when the width of the guard electrode 13 is less than 4 mm, the electrostatic capacitance difference sharply increased with increasing width. When the width is larger than 4 mm, the electrostatic capacitance difference gently increased with increasing width.

As can be viewed from the above, the use of the periphery guard wet electrode 13 located in the surrounding of the detection electrode 11 can suppress the direct coupling between the detection electrode 11 and the vehicle body 3. As a result, the detected capacitance difference between the child on the CRS and the adult can be made larger, and occupant determination accuracy can improve.

Next, the wetting detection mode will be described. In the wetting detection mode, the control circuit 24 switches the changeover switch 25 into the second state. Accordingly, the back surface guard electrode 12 and the periphery guard wet electrode 13 are not electrically connected to each other, and the periphery guard wet electrode 13 is grounded. In this case, the periphery guard wet electrode 13 does not function as the guard electrode but functions as a wet electrode.

In the wetting detection mode, the control circuit 24 further determines whether or the seat is wet (i.e., wetting of the seat occur), based on a current value (the value of current supplied from the signal application circuit 21 to the detection electrode 11 that is detected by the signal detection circuit 23 in the second state.

For example, when the seat base 30 is wet, a capacitance formed between the detection electrode 11 and the periphery guard wet electrode 13 is large. When the seat base 30 is not wet, the capacitance formed between the detection electrode 11 and the periphery guard wet electrode 13 is small. Because of this, the impedance from the detection electrode 11 to the periphery guard wet electrode 13 can be calculated in a manner similar to that in the occupant detection mode. From the imaginary part of the calculated impedance (i.e., detected capacitance), it can be determined whether or there is a wetting. Specifically, the imaginary part of the impedance is compared with a predetermined wetting detection threshold A. When the imaginary part of the impedance is smaller, it is determined that there is the wetting. When the imaginary part of the impedance is larger, it is determined that there is not the wetting.

Alternatively, the determination can be performed based on the current value in stead of the capacitance. For example, when the detected current value is smaller than a predetermined wetting detection threshold B, it is determined that there is not the wetting. When the detected current value is larger than a predetermined wetting detection threshold B, it is determined that there is the wetting.

Since the periphery guard wet electrode 13 functions as the periphery guard electrode in the occupant detection mode and functions as the wet electrode in the occupant detection mode, the number of parts can be reduced and the positioning can be facilitated as compared with a case where a dedicated periphery guard electrode and a dedicated wet electrode are placed in the surrounding of the detection electrode 11.

Figure 9:
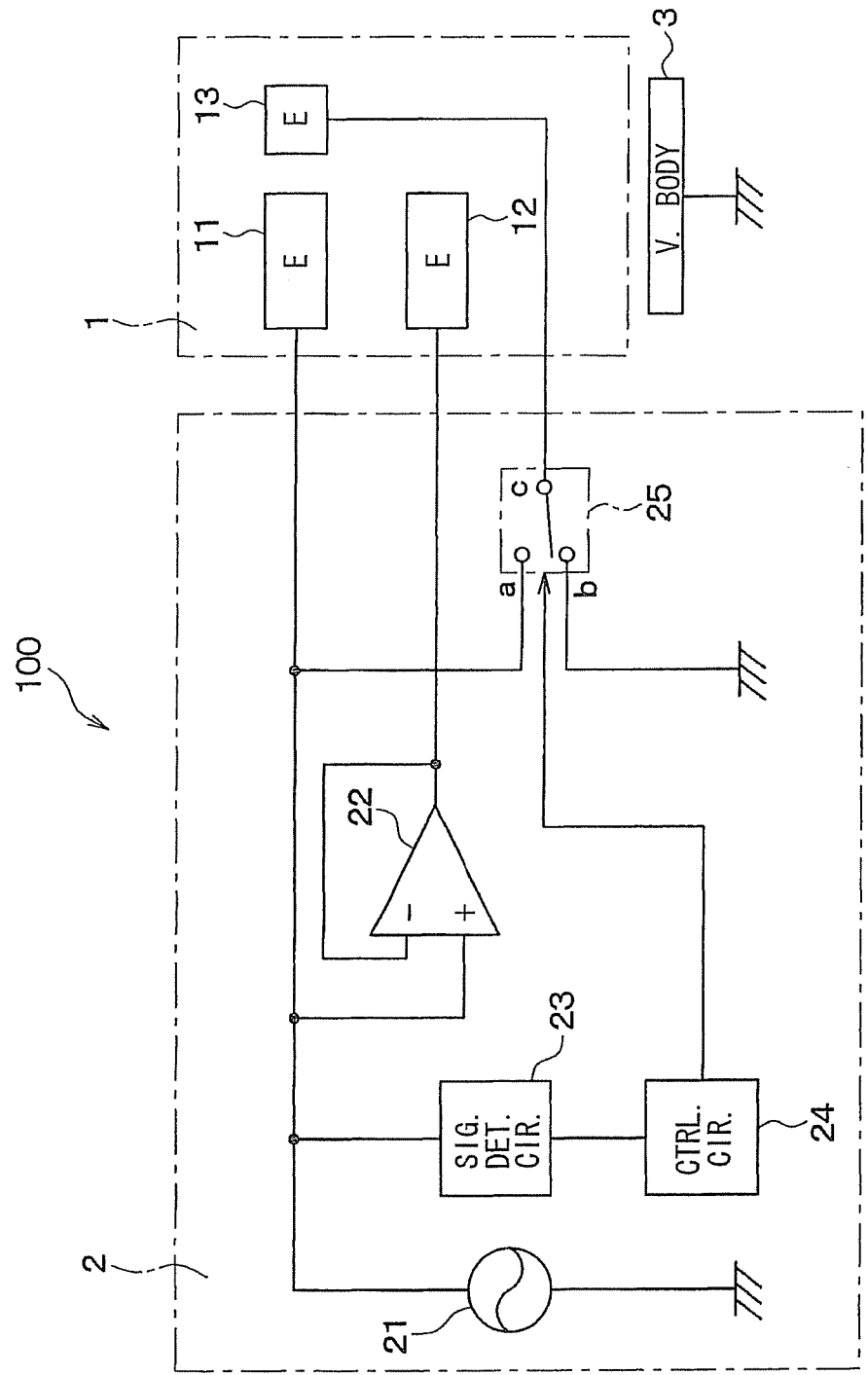
FIG. 9 is a circuit configuration diagram of a capacitive occupant detection apparatus of a comparison example.

For comparison, a circuit configuration of a capacitive occupant detection apparatus 100 of the comparison example is shown in FIG. 9. This configuration is different from the circuit configuration of the capacitive occupant detection apparatus 10 of the present embodiment in that the terminal "a" of the changeover switch 25 is connected to not the output terminal of the guard potential usage operational amplifier 22 but the signal line connecting the signal application circuit 21 to the detection electrode 11. Because of this, in the occupant detection mode of the capacitive occupant detection apparatus 100 of the related art, the electrode 13 has the same function as the detection electrode 11, and accordingly, the electrode 13 is directly coupled to the vehicle body 3, and the capacitance C2 of FIG. 41 becomes larger as compared with the present embodiment.

In the embodiment, the back surface guard electrode 12 and the periphery guard wet electrode 13 in the occupant detection mode correspond to an example of guard electrode. The back surface guard electrode 12 corresponds to an example of back surface guard part. The periphery guard wet electrode 13 corresponds to an example of periphery guard part.

A determination result of the control circuit 24 (indicating whether the occupant seated on the seat is an adult or a child on a CRS, and whether or not the seat has a wetting) is outputted to an in-vehicle apparatus such as the airbag ECU or the like. Thereafter, based on the outputted determination result, the in-vehicle apparatus performs processing, e.g., various notifications or the like. For example, when the determination result is outputted to the airbag ECU, and when the determination result indicates that the occupant seated on the seat is an adult, an airbag ON lamp lights up. When the determination result indicates that the occupant seated on the seat is a child on a CRS, an airbag OFF lamp lights up. When the determination result indicates that the seat has a wetting, a wetting lamp lights up. When the airbag ON lamp is lighting up, the airbag ECU deploys an airbag at a time of vehicle collision. When the airbag OFF lamp is lighting up, the airbag ECU prohibits airbag deployment even at a time of vehicle collision.

(Second Embodiment)

A second embodiment will be described below. The present embodiment differs from the first embodiment in only a structure of the sensor unit 1.

Figure 10:
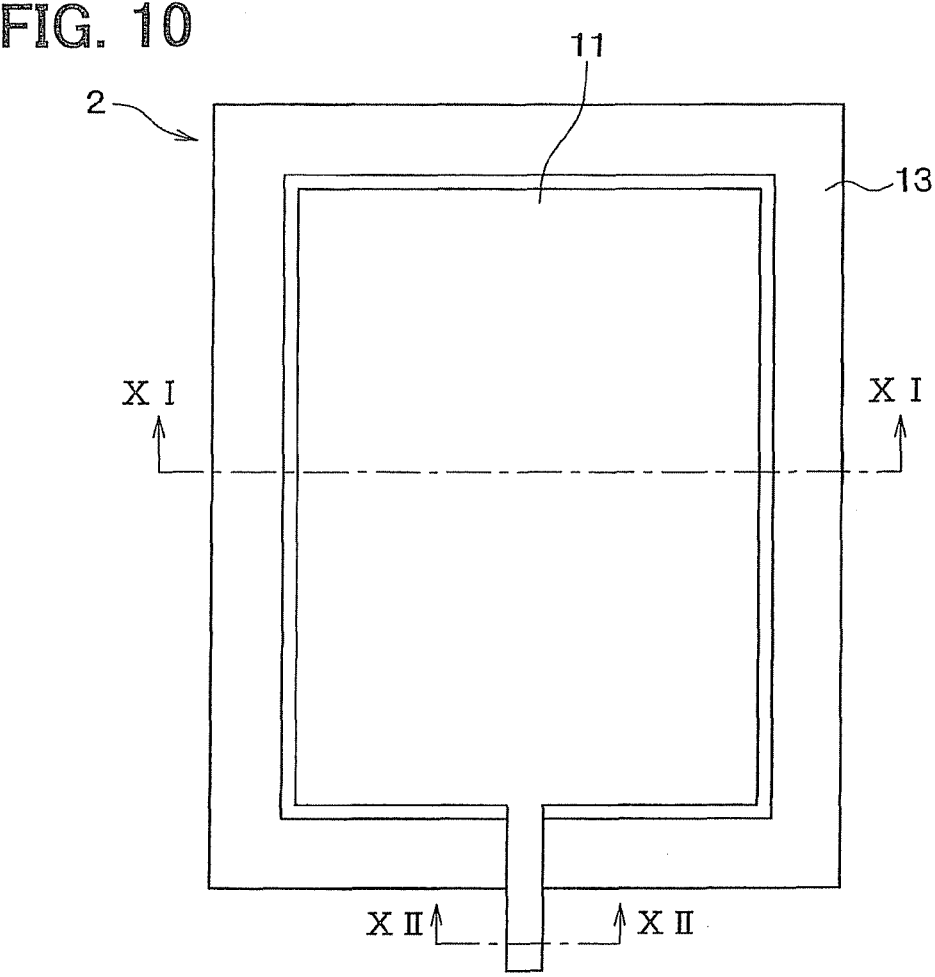
FIG. 10 is a diagram illustrating an arrangement of electrodes of a second embodiment.

The structure of the sensor unit 1 will be specifically described with reference to FIG. 10 to 13. FIG. 10 shows the sensor unit 1 installed to the seat base 30 and viewed from an upper side (i.e., detection target side) of the sensor unit 1. FIG.

Figure 11:
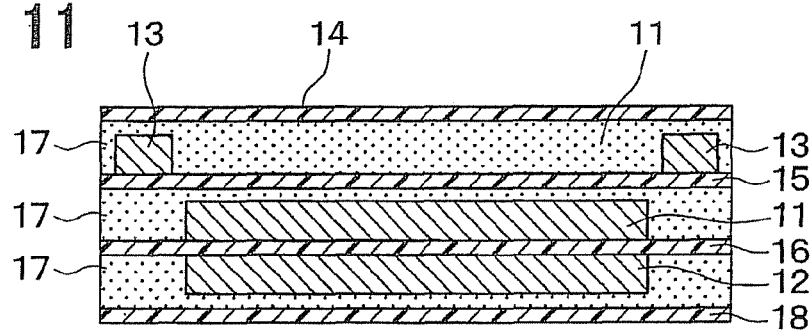
FIG. 11 is a cross sectional view of a sensor unit taking along line XI-XI in FIG. 10.
Figure 12:
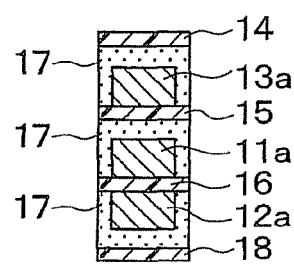
FIG. 12 is a cross sectional view of a sensor unit taking along line XII-XII in FIG. 10.
Figure 13:
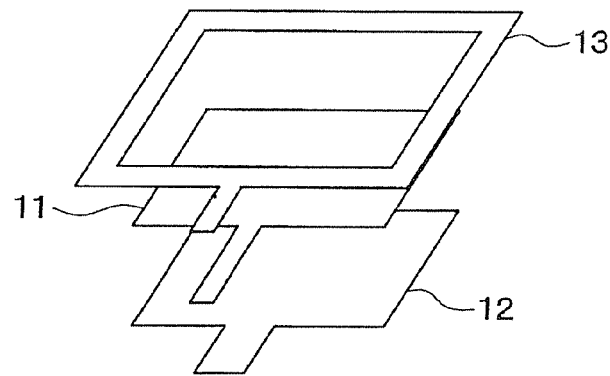
FIG. 13 is a perspective view for illustrating a three-layered structure of electrodes.

3 shows an arrangement of the detection electrode 11, the back surface guard electrode 12 and the periphery guard wet electrode 13 while eliminating the seat base 30 and the other components of the sensor unit 1 for the sake of simplicity. The upper side of FIG. 10 corresponds to a front side of the seat. Furthermore, FIGS. 11 and 12 are cross-sectional views taken along line XI-XI and line XII-XII in FIG. 10, respectively. FIG. 13 is a perspective view for illustrating a three-layered structure of the detection electrode 11, the back surface guard electrode 12 and the periphery guard wet electrode 13.

As shown in FIG. 10, the detection electrode 11 of the sensor unit 1 is formed as a film member having a quadangular plate shape like that in the first embodiment. Additionally, the periphery guard wet electrode 13 has a rectangular frame shape. When the sensor unit 1 is viewed from the upper side, the periphery guard wet electrode 13 is located in the surroundings of the detection electrode 11 and is located to surround an entire periphery of the detection electrode 11 and spaced apart from the detection electrode 11. When the seat base 30 is viewed from the upper side, the periphery guard wet electrode 13 and the detection electrode 11 do no overlap with each other, and thus, the periphery guard wet electrode 13 and the back surface guard electrode 12 do not overlap with each other. The back surface guard electrode 12 has the same size and shape as the detection electrode 11. The back surface guard electrode 12 is located on a lower side of the detection electrode 11 (a far side in FIG. 10), and spaced apart from and opposing the detection electrode 11. Thus, in FIG. 10, the back surface guard electrode 12 is hidden by the detection electrode 11 and is invisible.

As shown in FIG. 11 and FIG. 12, in order to configure these electrodes 11 to 13 into a single plate-shaped-mat, the sensor unit 1 includes the first film 14, the second film 15, the third film 16 and the adhesive 17 like those in the first embodiment, and further includes a fourth film 18.

The films 14 to 16, 18 are plate-shaped and electrically-insulating films that are size to such an extent that the films 14 to 16, 18 can cover the electrodes 11, 12, 13. For example, the films 14 to 16, 18 are made of PET. The films 14 to 16, 18 are layered and stacked from the top in this order. The periphery guard wet electrode 13 is arranged as a first layer between the first film 14 and the second film 15. The detection electrode 11 is arranged as a second layer between the second film 15 and the third film 16. The back surface guard electrode 12 is arranged as a third layer between the third film 16 and the fourth film 18. These members 11 to 16, 18 are bonded by the adhesive 17 (made of an electrically insulating material) filling in the first layer to the third layer.

The detection electrode 11, the back surface guard electrode 12 and the periphery guard wet electrode 13 are provided with the wire portions 11a, 12a, 13a made of the same material as the detection electrode 11, the back surface guard electrode 12 and the periphery guard wet electrode 13, respectively. The wire portions 11a, 12a, 13a extends toward a rear side of the seat base 30 (in a middle-to-lower direction in FIG. 3).

When viewed from the upper side of the seat base 30, these wire portions 11a, 12a, 13a are located at the same position. Thus, in FIG. 10, only the periphery guard wire portion 13a is visible, and the wire portions 11a, 12a are hidden by the periphery guard wire portion 13a and are invisible.

The detection electrode 11, the back surface guard electrode 12, the periphery guard wet electrode 13 are located in respective different layers, and thus, the wire portions 11a, 12a, 13a extending from the respective electrodes 11, 12, 13 can be put away from the sensor unit 1 without interfering with other connectors 11a, 12a, 13a (see FIG. 13).

As describe above, the detection electrode 11 and the periphery guard wet electrode 13 are placed in the same first layer. The back surface guard electrode 12 is placed in the second layer. Thus, it is unnecessary to provide a cutout portion to the periphery guard wet electrode 13. The wire portions 11a, 12a, 13a can be put away from the sensor unit 1 without interfering with other connectors 11a, 12a, 13a (see FIG. 6).

(Third Embodiment)

Figure 14:
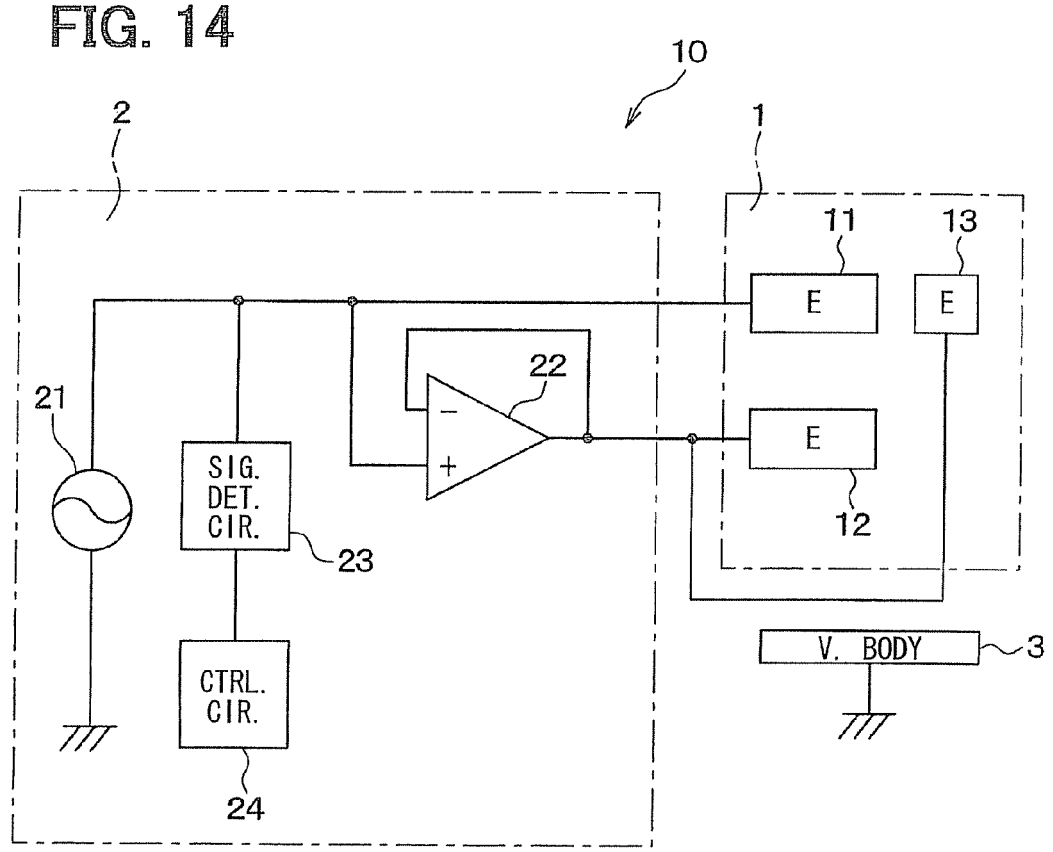
FIG. 14 is a diagram illustrating a circuit configuration of a capacitive occupant detection apparatus of a third embodiment.

A third embodiment will be described below. FIG. 14 is a diagram illustrating a circuit configuration of a capacitive occupant detection apparatus 10 of the third embodiment. The present embodiment is different from the first and second embodiments in that the capacitive occupant detection apparatus 10 of the present embodiment does not operate in the wet detection mode but operates in the occupant detection mode only.

Therefore, as shown in FIG. 14, the control unit 2 of the present embodiment does not include the changeover switch 25 of the first embodiment. An electrode 13 (the same electrode as the periphery guard wet electrode 13 of the first embodiment) is always electrically-connected to the back surface guard electrode 12. The electrode 13 functions as only the periphery guard electrode and does not function as the wet electrode. A configuration and an arrangement of the sensor unit 1 is the same as that in those in the first embodiment.

Because of the above, the present embodiment can achieve an advantage as equivalent as when the changeover switch 25 is always in the first state in the first and/or second embodiments. Moreover, since the changeover switch 25 is unnecessary, it is possible to reduce manufacturing cost of the capacitive occupant detection apparatus 10.

(Fourth Embodiment)

A fourth embodiment will be described below. The present embodiment can be different from the first embodiment in only a structure of the sensor unit 1 and an arrangement of the control unit 2. The other configurations and operation procedures for occupant detection can be the same as those in the first embodiment. It should be noted that, in operation of the present embodiment, electrostatic capacitance detection with the detection electrode 11 is capacitance detection in the occupant detection mode.

Figure 18:
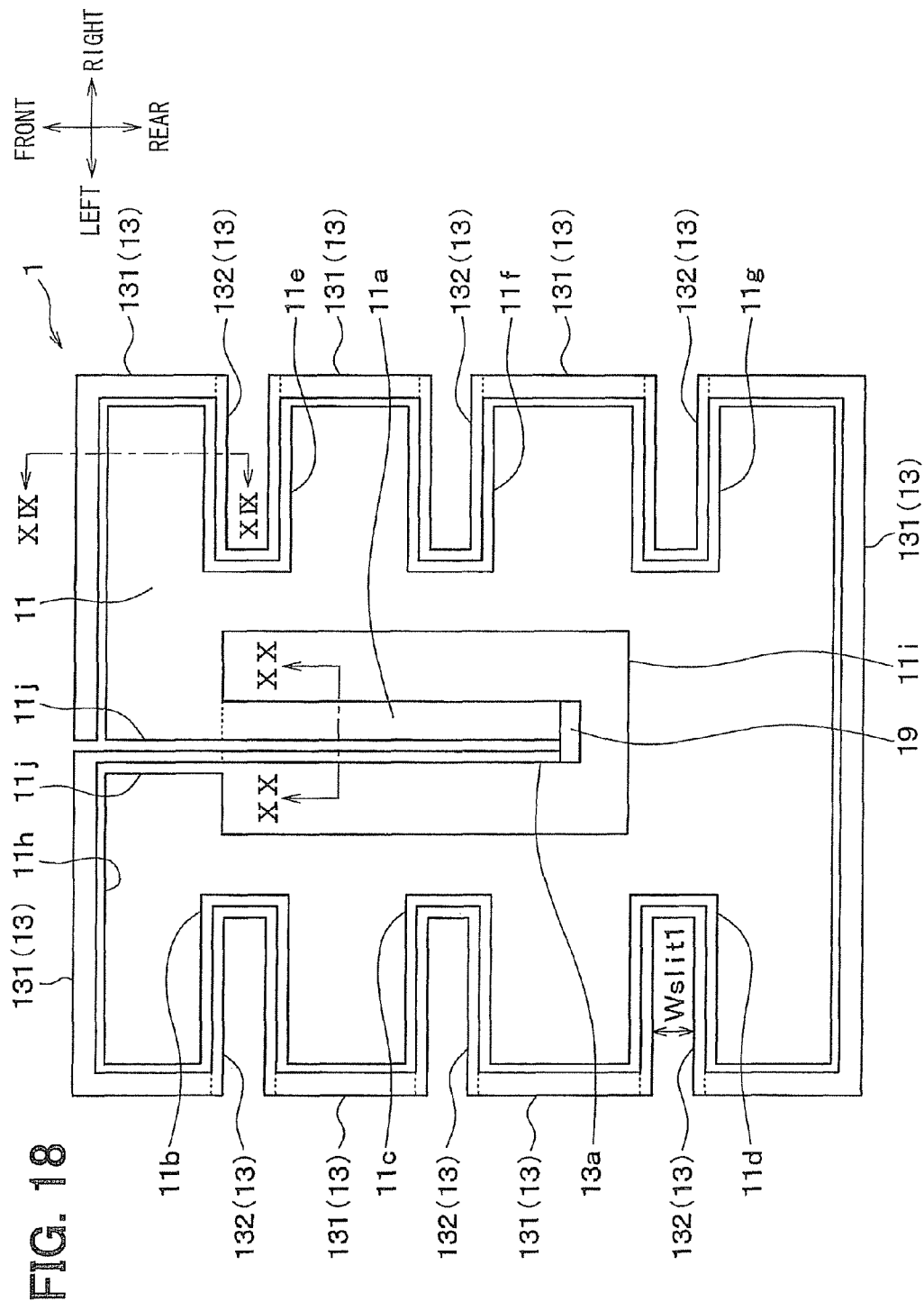
FIG. 18 is a diagram illustrating a configuration of a sensor unit of a fourth embodiment.
Figure 19:
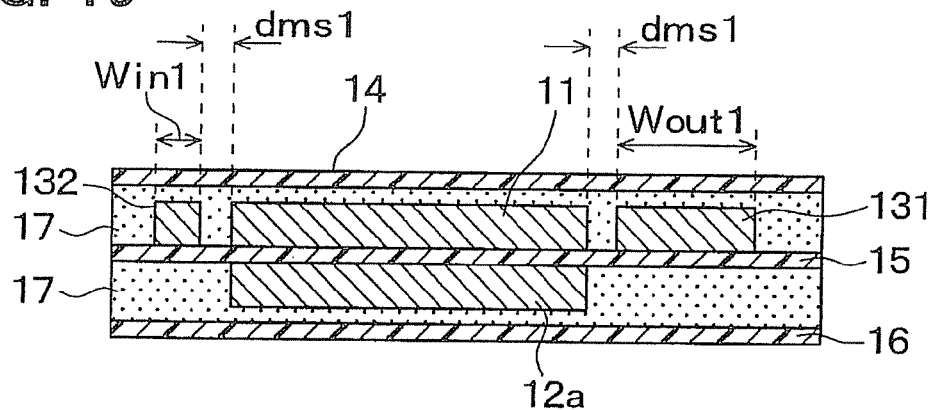
FIG. 19 is a cross-sectional view of a sensor unit taken along line XIX-XIX in FIG. 18.
Figure 20:
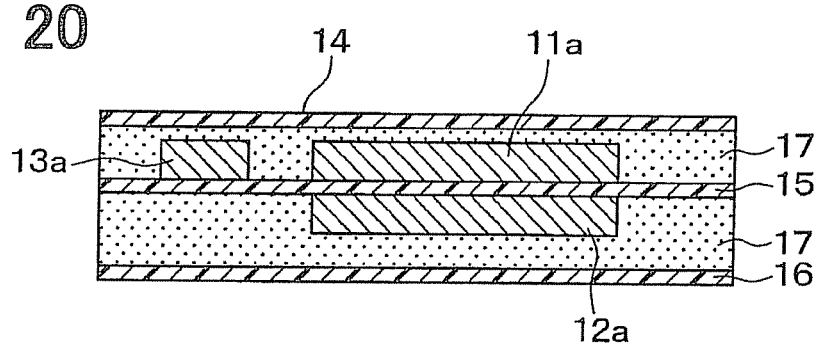
FIG. 20 is a cross-sectional view of a sensor unit taken along line XX-XX in FIG. 18.

Details of the structure of the sensor unit 1 will be described with reference to FIG. 18 to 20. FIG. 18 shows the sensor unit 1 viewed from an upper side of the seat base 30 (i.e., from a person or an object serving as a detection target). FIG. 18 illustrates an arrangement of a detection electrode 11, a back surface guard electrode 12, a periphery guard wet electrode 13, wire portions 11a to 13a, and a connector connection portion 19, while eliminating the seat base 30 and the other components of the sensor unit 1 for the sake of simplicity. The connector connection portion 19 is for connection of a connector of the control unit 2. The upper side of FIG. 18 corresponds to a front side of the seat. FIGS. 19 and 20 are cross-sectional views taken along line XIX-XIX and line XX-XX in FIG. 18, respectively. In FIG. 18 to FIG. 20, width of the periphery guard wet electrode 13, width of the periphery guard wire portion 13a and the like are exaggerated from their actual sizes for purpose of improving the visibility.

As shown in FIG. 18, the detection electrode 11 of the sensor unit 1 is shaped into approximately a quadangular sheet, an outer shape of which has multiple cutouts. There are three cutouts in a left edge, three cutouts in a right edge, and one cutout on a seat front side edge (corresponding to an upper edge in FIG. 18), so that the total number of cutouts is seven. Alternatively, the total number of cutouts may be smaller than or larger than seven.

Six depression portions 11b to 11g formed by the six cutouts on the left and right sides are depressed with respect to the outer shape of the detection electrode 11. The depression portion 11b to 11g has a U-shape, which opens in a direction away from the sensor unit 1. In the detection electrode 11, the outer edge 11h of the detection electrode 1 is formed by these depression portions 11b to 11g and edge portions, which are arranged to face the outside of the detection electrode 11.

The cutout of the detection electrode 11 on the seat rear side forms an inner edge 11i (this also corresponds to an example of depression portion) in an inside of the detection electrode 11 and further forms connection portions 11j connecting the inner edge 11i and the outer edge 11h. The width of the cutout between the connection portions 11j (length in a left-to-right direction in FIG. 18) is smaller than a width of the cutout between the inner edges 11i (length in a left-to-right direction in FIG. 18). A detection electrode wire portion 11a with a stripe-shape is formed of the same material as the detection electrode 11 and integrated with the detection electrode 11. Into a region surrounded by the inner edge 11i, the detection electrode wire portion 11a extends from a place in the vicinity of a boarder between the connection portion j and the inner edge 11i. In FIG. 18, the dotted line shows a hypothetical boarder between the detection electrode 11 and the detection electrode wire portion 11a.

As shown in FIG. 19, the back surface guard electrode 12 has the same shape as the detection electrode 11, so that when viewed from the upper side of the sensor unit 1 (upper side in FIG. 19), the back surface guard electrode 12 conforms to and overlaps with the detection electrode 11. A stripe-shaped back surface guard wire portion 12a (see FIG. 20), which is made of the same material as the back surface guard electrode 12 and integrated with the back surface guard electrode 12, extends from the back surface guard electrode 12. This back surface guard wire portion 12a has the same shape as the detection electrode wire portion 11a, so that when viewed from the upper side of the sensor unit 1 (upper side in FIG. 20), the back surface guard wire portion 12a conforms to and overlaps with the detection electrode wire portion 11a.

As shown in FIG. 18, a periphery guard wet electrode 13 with a stripe shape is spaced apart from the detection electrode 11 and is located to surround the outer edge 11h of the detection electrode 11. In particular, with respect to the depression portions 11b to 11g of the detection electrode 11, the periphery guard wet electrode 13 is located along the depression portion 11b to 11g so as to have U shape portions matching the corresponding depression portions 11b to 11g.

The periphery guard wet electrode 13 includes multiple depression guard portions 132 located along the depression portions 11b to 11g of the detection electrode 11 and multiple outer periphery guard portions 131 located along outer shape portions (i.e., portions which form the outer shape of the detection electrode 11) of the outer edge 11h other than the depression portions 11b to 11g. FIG. 18 uses the dotted line to show a hypothetical boarder between the outer periphery guard portion 131 and the depression guard portion 132.

As shown in FIG. 19, the width of the outer periphery guard portion 131 is denoted by "Wout1". The width of the depression guard portion 132 is denoted by "Win1". The width "Wout1" is the same throughout the outer periphery guard portion 131. The width "Win1" is the same throughout the depression guard portion 132. As shown in FIG. 19, a distance from the detection electrode 11 to the outer periphery guard portion 131 and a distance from the detection electrode 11 to the depression guard portion 132 are the same distance "dms1" throughout any portion.

The periphery guard wet electrode 13 extends into the region between the connection portions 11j of the detection electrode 11. In the region surrounded by the inner edge 11i of the detection electrode 11, a periphery guard wire portion 13a having a stripe shape extends from the periphery guard wet electrode 13. The periphery guard wire portion 13a is integrated with the periphery guard wet electrode 13 and made of the same material as the periphery guard wet electrode 13. FIG. 18 uses the dotted line to show a hypothetical boarder between the periphery guard wet electrode 13 and the periphery guard wire portion 13a.

In any cross section taken parallel to line XX-XX, the wire portions 11a, 12a, 13a have a cross section structure like that shown in FIG. 20. Thus, the wire portions 11a, 12a, 13a are close to each other and arranged to run side by side. More specifically, the back surface guard wire portion 12a extends parallel to the detection electrode wire portion 11a while being spaced from the detection electrode wire portion 11a. When the sensor unit 1 is viewed from the upper side (i.e., viewed from the detection target), the back surface guard wire portion 12a conforms to and overlaps with the detection electrode wire portion 11a. Moreover, the periphery guard wire portion 13a extends parallel to the detection electrode wire portion 11a while being spaced from the detection electrode wire portion 11a. When the sensor unit 1 is viewed from the upper side (i.e., viewed from the detection target), the periphery guard wire portion 13a is located away from the detection electrode wire portion 11a.

Now, explanation is given on the width "Wout1" of the outer periphery guard portion 131 and the width "Win1" of the depression guard portion 132. As explained in the first embodiment, both of the width "Wout1" and the width "Win1" may be more than or not more than 4 mm.

As for the width "Wout1" of the outer periphery guard electrode 131 of an outer periphery part, the infinitely small width can most reduce the capacitive coupling between the detection electrode 11 and the ground. In particular, however, since it is difficult to set the infinitely large width, the width is set to such a degree that can achieve a capacitive coupling reduction to some extent.

Figure 22:
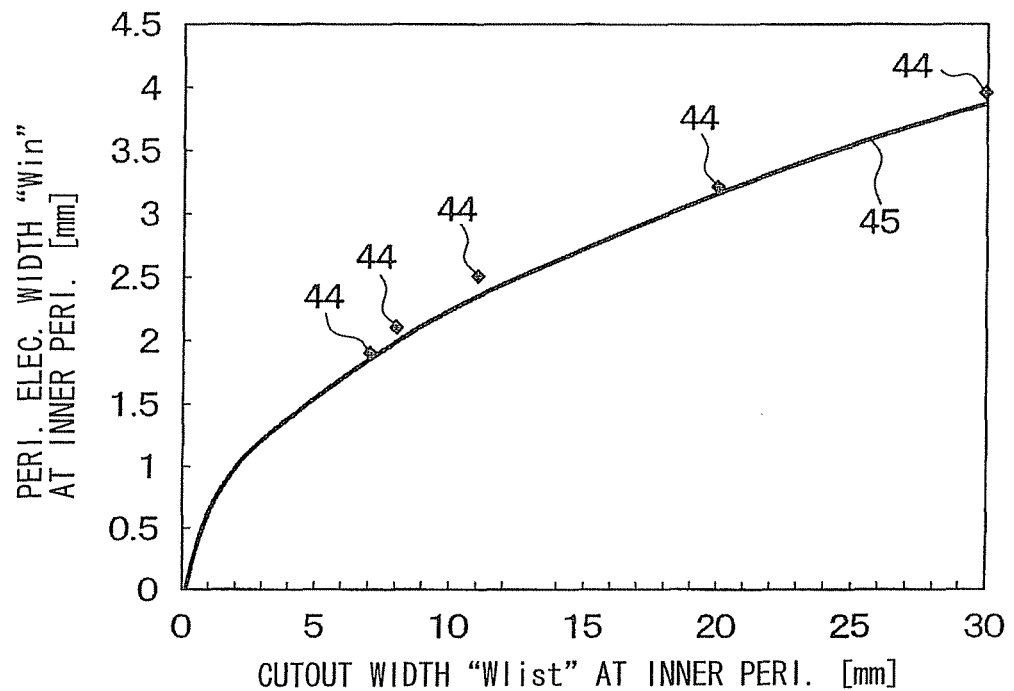
FIG. 22 is a graph illustrating a relation between slit width "Wslit" and predetermined width "Win" of a periphery guard electrode.

More specifically, according to simulations of the inventors of the present application, a correspondence relation of the width "Wout1" of the periphery guard electrode 131 with a capacitive coupling (electrostatic capacitance) between the detection electrode 11 and the ground when the periphery guard electrode 131 is absent can be represented by the solid line 41 in FIG. 22. Based on the solid line 41 in FIG. 22, the width "Wout1" is set.

In the simulation, the capacitance value is simulated under a condition that a total area of the detection electrode 11 is 240 $cm^2$ and that a hip of the occupant is located 15 mm apart from the electrode 11 in a vertical direction. This condition is also used in the below-described simulations.

Figure 21:
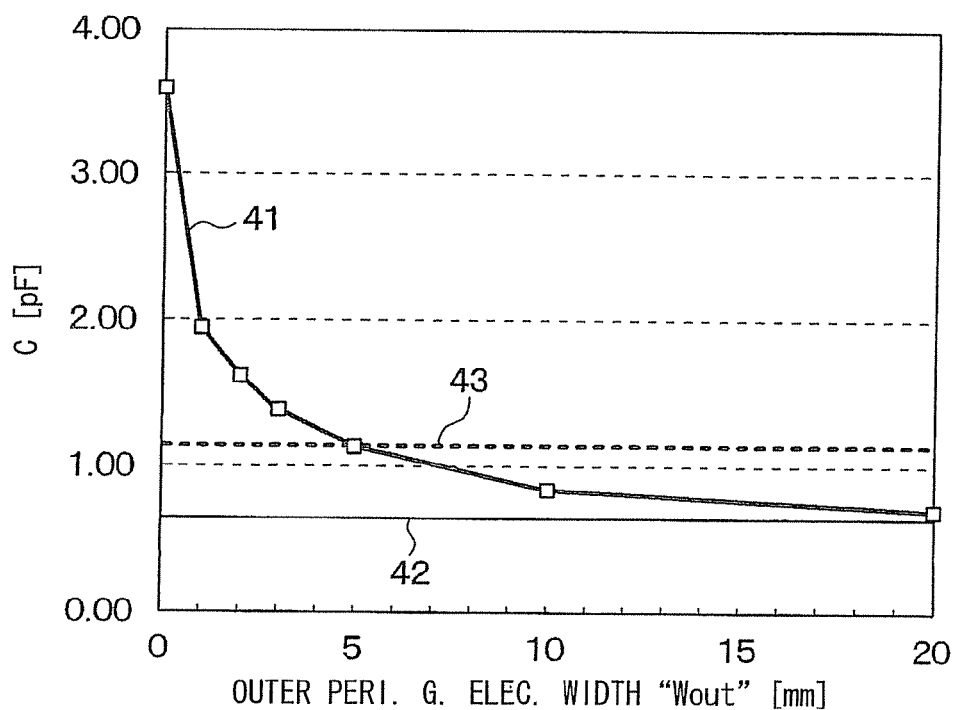
FIG. 21 is a graph illustrating a relation between width "Wout" of a periphery guard electrode and electrostatic capacitance.

An actual width "Wout1" is set from a range where the reduction is not less than 85% of the difference, which is from the case of the absence of the outer periphery guard portion 131 (when Wout1=0) to a convergence value 42 (a capacitive coupling in the case where the width "Wout1" is infinitely large). In other words, an actual width "Wout1" is set from a range where the solid line 41 is equal to or less than the dotted lien 43. According to FIG. 21, when the width "Wout1" is greater than or equal to 5 mm, the capacitive coupling is less than or equal to a value 43 that is 115% of the convergence value at the infinitely large width. Hence, the width "Wout" of the outer periphery guard portion 131 is set to satisfy a relation "Wout≥5.0 mm". For example, the setting may be Wout=5 mm.

The width "Win1" of the depression guard portion 132 has a relation with the cutout width "Wslit1" of the depression portion 11b to 11g corresponding to the depression guard portion 132 (see FIG. 18). Since the cutting away from the detection electrode 11 forms the depression portion and the space and since the periphery guard wet electrode 13 is placed in the space so as to be located along the depression portion, an elongated empty space surrounded by the periphery guard wet electrode 13 is formed. A width of this empty space in a direction perpendicular to the longitudinal direction of the empty space is the cutout width "Wslit1" of the depression portion. In other words, the cutout width "Wslit1" is a clearance to the periphery guard wet electrode 13, which exits on an opposite side from the detection electrode 11. In designing the sensor unit 1, in usual, this cutout width "Wslit1" is set, and thereafter, the width of the periphery guard wet electrode 13 and the shape of the detection electrode 11 are determined.

In the present embodiment, in every depression portion 11b to 11g, the cutout width "Wslit1" is the same. FIG. 22 shows a result of simulation. The horizontal axis indicates the cutout width "Wlist1" of the depression portion 11b to 11g. The vertical axis indicates the width "Win1" of the depression guard portion 132 (corresponding to the point 44). FIG. 22 plots the width "Win1" when the capacitive coupling becomes 115% of the capacitive coupling converged at the infinitely large width "Win1" of the depression guard portion 132. From this result, an approximated expression of a relation between the width "Win" of the periphery guard electrode" at an inner periphery and the cutout width "Wslist" can be obtained as $Win1=((Wslit1)/2)^{1/2}$ (corresponding to the solid line 45). From this, for example, when the cutout width "Wslit1" is 8 mm, an optimum value of the width of the periphery guard electrode in the inner periphery may be 2 mm.

Figure 23:
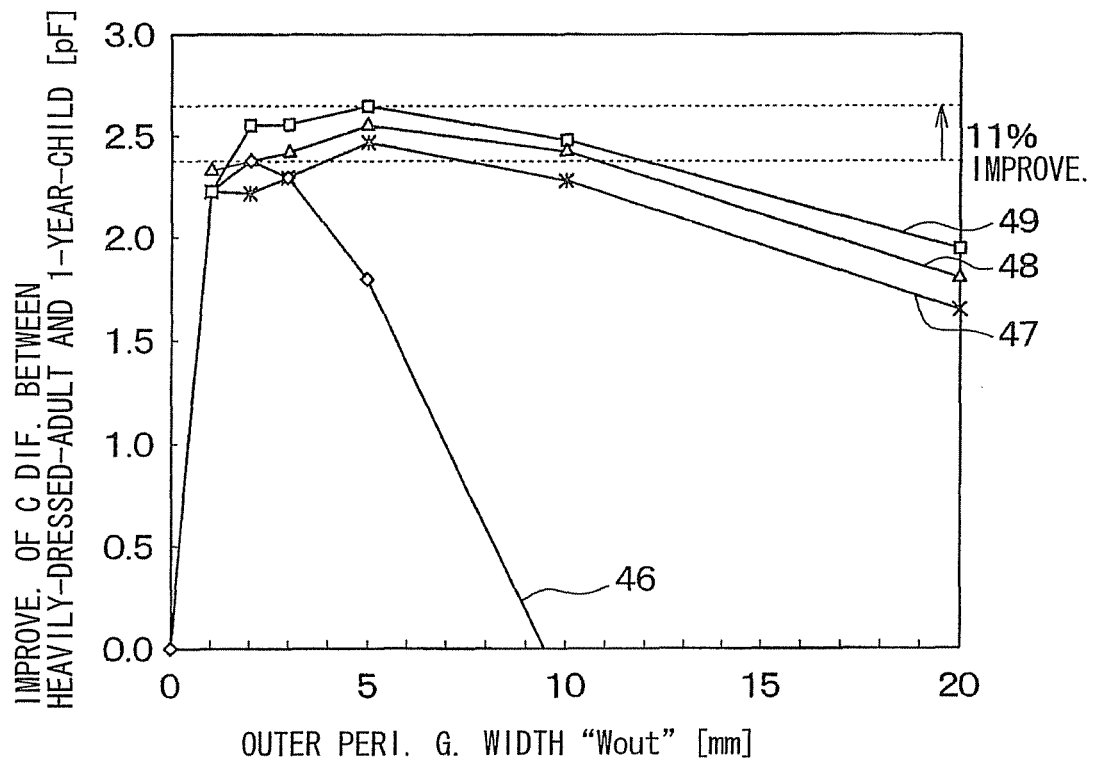
FIG. 23 is a graph illustrating a graph illustrating a detected capacitance difference between heavily-dressed adult and one-years-old children on CRS while changing width "Wout" and width "Win"

As one example of the present embodiment, FIG. 23 shows a result of simulation on the detected capacitance difference between when the detection target is heavily-dressed adult and when the detection target is a one-years-old child on the CRS. In the simulation, the width "Wout1" of the outer periphery guard portion 131 and the width "Win1" of the depression guard portion 132 are changed. The sensor unit 1 has a total size of 300 mm long (in an upper-to-lower direction in FIG. 18) and 400 mm wide (in a left-to-right direction in FIG. 18), and has the cutout width "Wslit1" is 11 mm.

In FIG. 23, the horizontal axis indicates the width "Wout1" of the outer periphery guard portion 131 and the vertical axis indicates the detected capacitance difference. The solid line 46 shows a result of the simulation when the width "Wout1" and the width "Win1" are equal to each other. The solid line 47 shows a result of the simulation when the width "Win1" is 3 mm. The solid line 47 shows a result of the simulation when the width "Win1" is 2 mm. The solid line 47 shows a result of the simulation when the width "Win1" is 1 mm.

When the width "Win1" is fixed at 1 mm and the width "Wout1" is 5 mm, capacitance difference improvement by the periphery guard electrode is about 11%, as compared with the maximum capacitance difference when the width "Win1" and the width "Wout1" are the same width. This simulation result shows that when the width "Win" is shorter than the width "Wout1", distinguishing between the adult and the child is facilitated.

Figure 24:
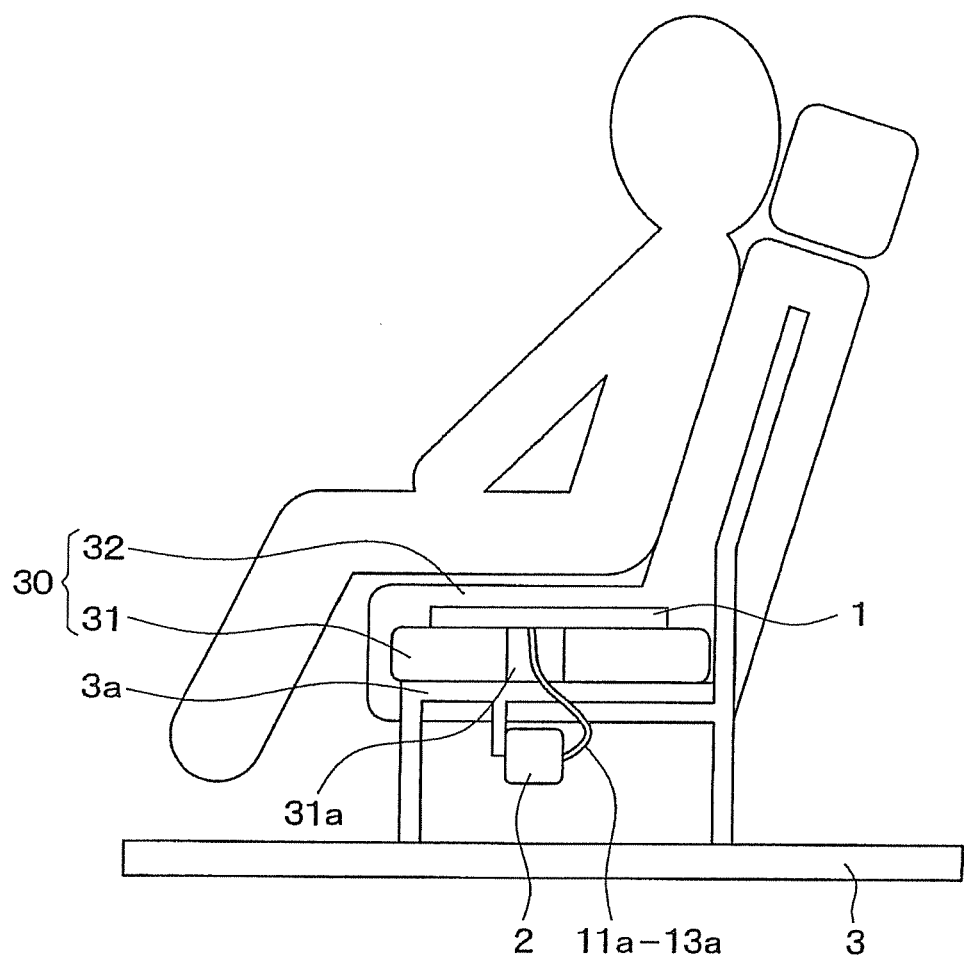
FIG. 24 is a diagram illustrating a state of a sensor unit and a control unit installed in a vehicle.

Next, a manner of installation of the sensor unit 1 and the control unit 2 into the vehicle according to the present embodiment will be described with reference to FIG. 24. The sensor unit 1 is located between the seat cushion 31 and the seat cover 32 of the seat base 30 and is attached to the seat cushion (urethane cushion) 31. This is the same in other embodiments.

The present embodiment can be different form the first and second embodiments in that the control unit 2 is mounted to a seat frame 3a on a back side of the seat base 30. Because of this, in order to connect the wire portions 11a, 12a, 13a and the control unit 2, the wire portions 11a, 12a, 13a of the sensor unit 1 need to run so as to extend from the upper to lower of the seat cushion 31. Because of this, a through-hole 31a from the upper (seating face side) to the lower (a back side) of the seat cushion 31 is formed. The wire portions 11a, 12a, 13a pass through this hole and are connected to the connector of the control unit 2, whereby the sensor unit 1 and the control unit 2 are connected.

In the above, the detection electrode 11 is fixed between the seat cushion 31 and the seat cover 32, while the wire portions 11a, 12a, 13a are not fastened in an inside of the through-hole 31a and are merely hung down. Thus, the wire portions 11a, 12a, 13a have movement freedom.

The detection electrode wire portion 11a is made of the same material as and integrated with the detection electrode 11, as described above. This alone may lead to a capacitive coupling or a magnetic coupling to a surrounding conductive body in response to the electric signal application. Because of this, objects other than the detection target, which is to be measured with the detection electrode of the sensor unit 1, may be measured, or, measurement noise may be generated, and as a result, sensing performance may degrade. Furthermore, when the detection electrode wire portion 11a has the movement freedom as described above, the detection electrode wire portion 11a may be coupled to the seat frame 3a or the like. The electrostatic capacitance due to the coupling may vary according to movement of the detection electrode wire portion 11a and may become a cause of detection value variation.

In view of this, in the present embodiment, the back surface guard wire portion 12a and the periphery guard wire portion 13a are located in the vicinity of the detection electrode wire portion 11a so as to extend side by side with the detection electrode wire portion 11a, as described above. More specifically, the back surface guard wire portion 12a extends parallel to the detection electrode wire portion 11a while being spaced apart from the detection electrode wire portion 11a. When the sensor unit 1 is viewed from the upper side, the back surface guard wire portion 12a is located to conform to and overlap with the detection electrode wire portion 11a. The periphery guard wire portion 13a extends parallel to the detection electrode wire portion 11a while being spaced from the detection electrode wire portion 11a. When the sensor unit 1 is viewed from the upper side, the periphery guard wire portion 13a is located away from the detection electrode wire portion 11a.

According to the above structure, in the occupant detection mode, the main signal is applied to the detection electrode 11 through the detection electrode wire portion 11a, and at the same time, the periphery guard signal is applied to the periphery guard wet electrode 13 through the periphery guard wire portion 13a. Thus, the main signal and the periphery guard signal, respectively, are applied to the detection electrode wire portion 11a and the guard wire portion 13a at the same time. Furthermore, at the same time, the back surface guard signal is applied to the back surface guard wire portion 12a.

Therefore, it is possible to suppress a capacitive coupling between the detection electrode wire portion 11a and the ground (the vehicle body 3, the seat frame 3a or the like) and a capacitive coupling between the detection electrode wire portion 11a and the detection target (human body, CRS or the like). In this relation, because of the presence of the periphery guard wire portion 13a at the periphery in addition to the back surface guard wire portion 12a on the back surface side, it is possible to effectively suppress the capacitive coupling between the detection electrode wire portion 11a and the ground, and the capacitive coupling between the detection electrode wire portion 11a and the detection target.

The capacitive occupant detection apparatus 10 of the present embodiment may have the same circuit configuration as that of the third embodiment. In this case, the periphery guard wet electrode 13 serves as the periphery guard electrode.

Now, explanation will be given on the clearance "dms1". The smaller clearance "dms1" between the detection electrode 11 and the periphery guard wet electrode 13 enhances the advantage associated with the periphery guard wet electrode 13 serving as the periphery guard electrode. If the clearance "dms1" is too large, the advantage of suppressing the unwanted capacitive coupling between the detection electrode 11 and the ground reduces.

Figure 25:
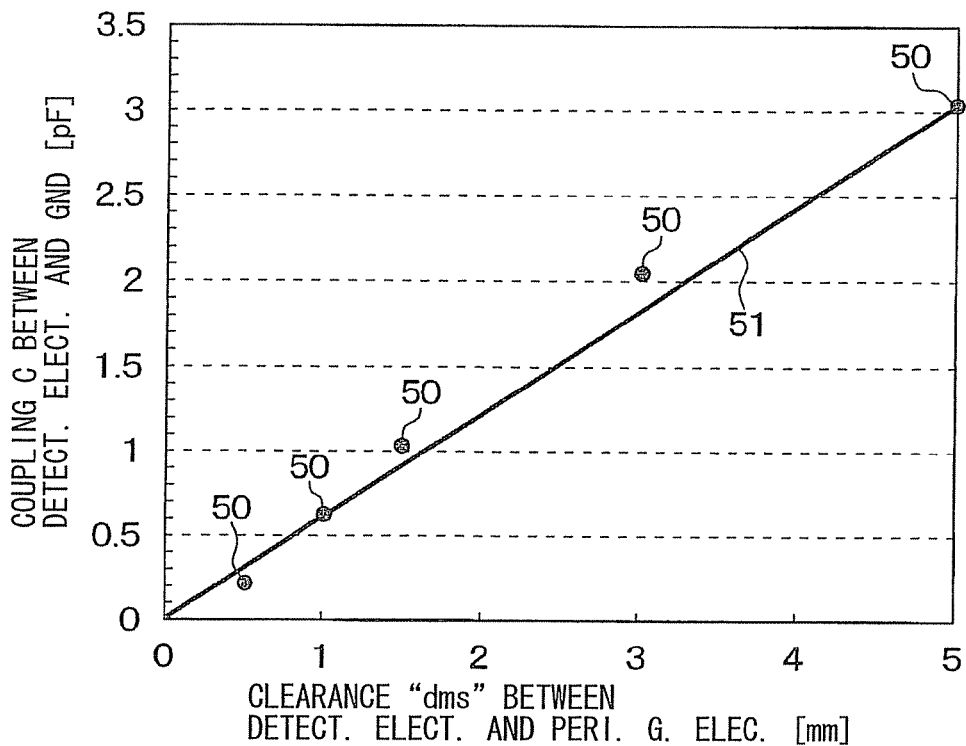
FIG. 25 is a graph for explaining a relation of a clearance "dms" between a detection electrode and the periphery guard electrode with a detection electrode.

FIG. 25 shows a simulation result 50 when the width "Win" of the periphery guard wet electrode 13 (corresponding to both of "Win1" and "Win2" in the present description) is infinitely large. The horizontal axis indicates the clearance "dms" between the detection electrode 11 and the periphery guard wet electrode 13 (corresponding to not only "dms1" but also the below-described dms2" in the present description). The vertical axis indicates the capacitive coupling between the detection electrode 11 and the ground. A limit "Csg_limit" (vertical axis value of the point 50) for enabling suppression of the unwanted coupling between the detection electrode 11 and the ground by the periphery guard wet electrode 13 can be approximated by a straight line 51 passing through the point of origin. The inclination of this straight line varies according to detailed structure of the sensor unit 1. However, for any structure, the inclination can be estimated from the capacitive coupling between the detection electrode 11 and the ground measured in arbitrary clearance "dms". When this inclination is denoted by "a", a relation $Csg\_limit = a \times dms$ is satisfied.

Figure 26:
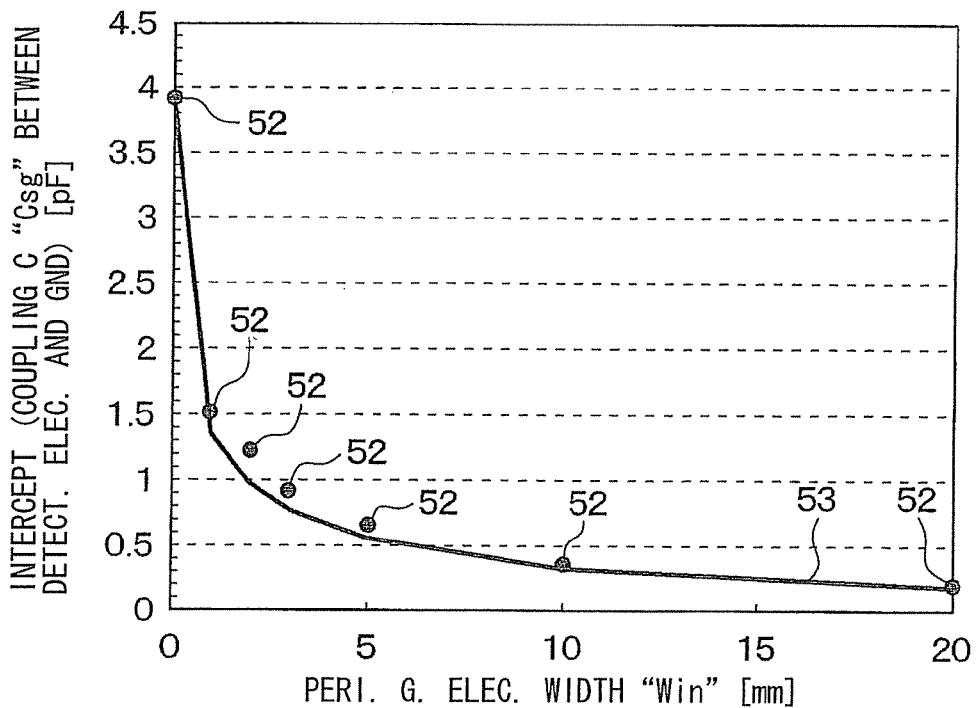
FIG. 26 is a graph for explaining a relationship between a detection electrode and a clearance "dms" between a detection electrode and the periphery guard electrode.

The unwanted capacitive coupling "Csg" between the detection electrode 11 and the ground when the width "Win" of the periphery guard wet electrode 13 is finite can be approximated by an expression that is obtained by parallel translation of the above-described expression in the vertical axis direction. A relation between an intercept, which is changed by the parallel translation, and the width "Win" can be obtained from a simulation result 52 shown in FIG. 26. Herein, the intercept corresponds to the unwanted capacitive coupling "Csg" between the detection electrode 11 and the ground when the clearance "dms" is zero. According to the simulation result 52, the relation between the intercept and the width "Win" can be approximated by the solid line 53 shown in FIG. 26.

An expression of this solid line 53 is given as: the intercept $= Climit0/(2-0.1^{Win}+Win)$, where the "Climit0" is the unwanted capacitive coupling "Csg" between the detection electrode 11 and the ground when the width "Win" of the periphery guard wet electrode 13 is 0 mm (when the periphery guard wet electrode 13 is absent). This value can be easily obtained from actual measurement or the like. The unwanted capacitive coupling "Csg" between the detection electrode 11 and the ground can be defined as a relation $Csg = a \times dms + Climit0/(2-0.1^{Win}+Win)$, which is a relation between the width "Win" of the periphery guard wet electrode 13 and the clearance "dms" between the detection electrode 11 and the periphery guard wet electrode 13. Hence, by determining a target value of the unwanted capacitive coupling "Csg" between the detection electrode 11 and the ground, it is possible to obtain a required value of the clearance "dms" between the detection electrode 11 and the periphery guard wet electrode 13, and a required value of the width "Win" of the periphery guard wet electrode 13.

Figure 27:
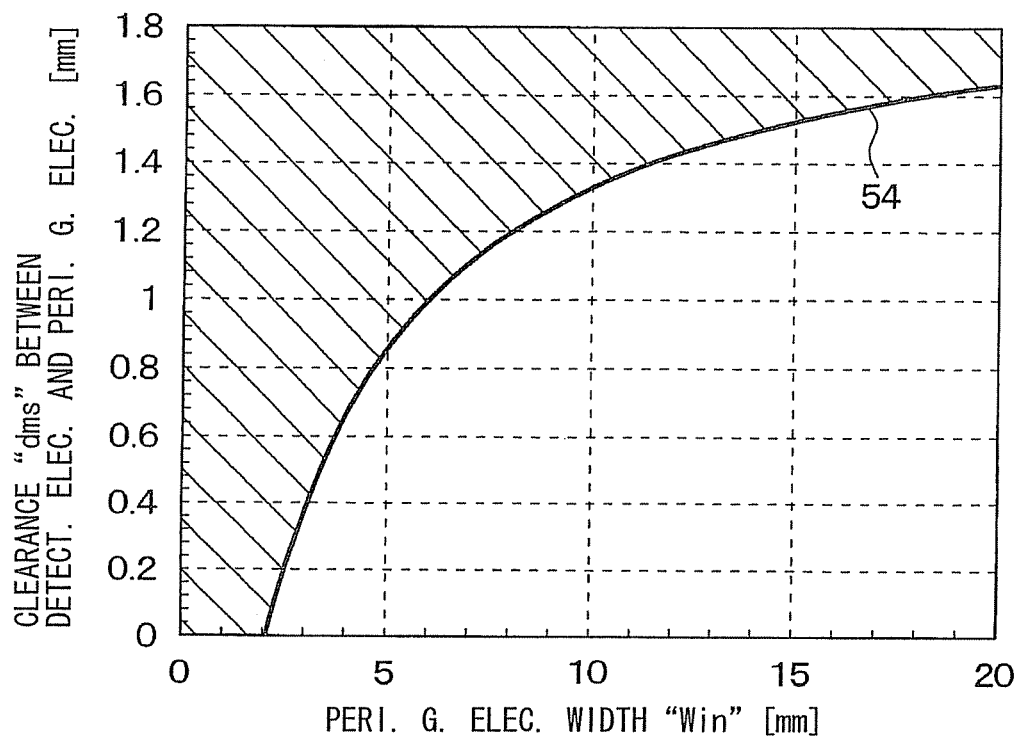
FIG. 27 is a graph illustrating a relationship of a clearance "dms" between a detection electrode and the periphery guard electrode with a detection electrode.

For example, there is a relation expression $$dms \leq (Csg - Climit0/(2-0.1^{Win}+Win))/a = 1.0 - 4.0/(2-0.1^{Win}+Win)$$

when: the inclination "a" of the approximated straight line, which is associated with the clearance "dms" and the limit "Csg_limit" for enabling the suppression of the unwanted coupling between the detection electrode 11 and the ground, is 0.5; a unwanted capacitive coupling "Climit" between the detection electrode 11 and the ground when the width "Win" of the periphery guard wet electrode 13 is zero is 4.0 pF; and the target value of the unwanted coupling "Csg" between the detection electrode 11 and the ground is less than or equal to 1.0 pF. A range indicated by this expression is shown in FIG. 27. In FIG. 27, an area except a shadow area shows a range where the target value condition, which is a condition that the unwanted coupling between the detection electrode 11 and the ground is less than or equal to the target value 1.0 pF. For example, when the clearance "dms1" between the detection electrode 11 and the depression guard portion 132 is 0.5 mm, the target value is attained when the width "Win" of the depression guard portion 132 is 3.35 mm or less.

(Fifth Embodiment)

Figure 28:
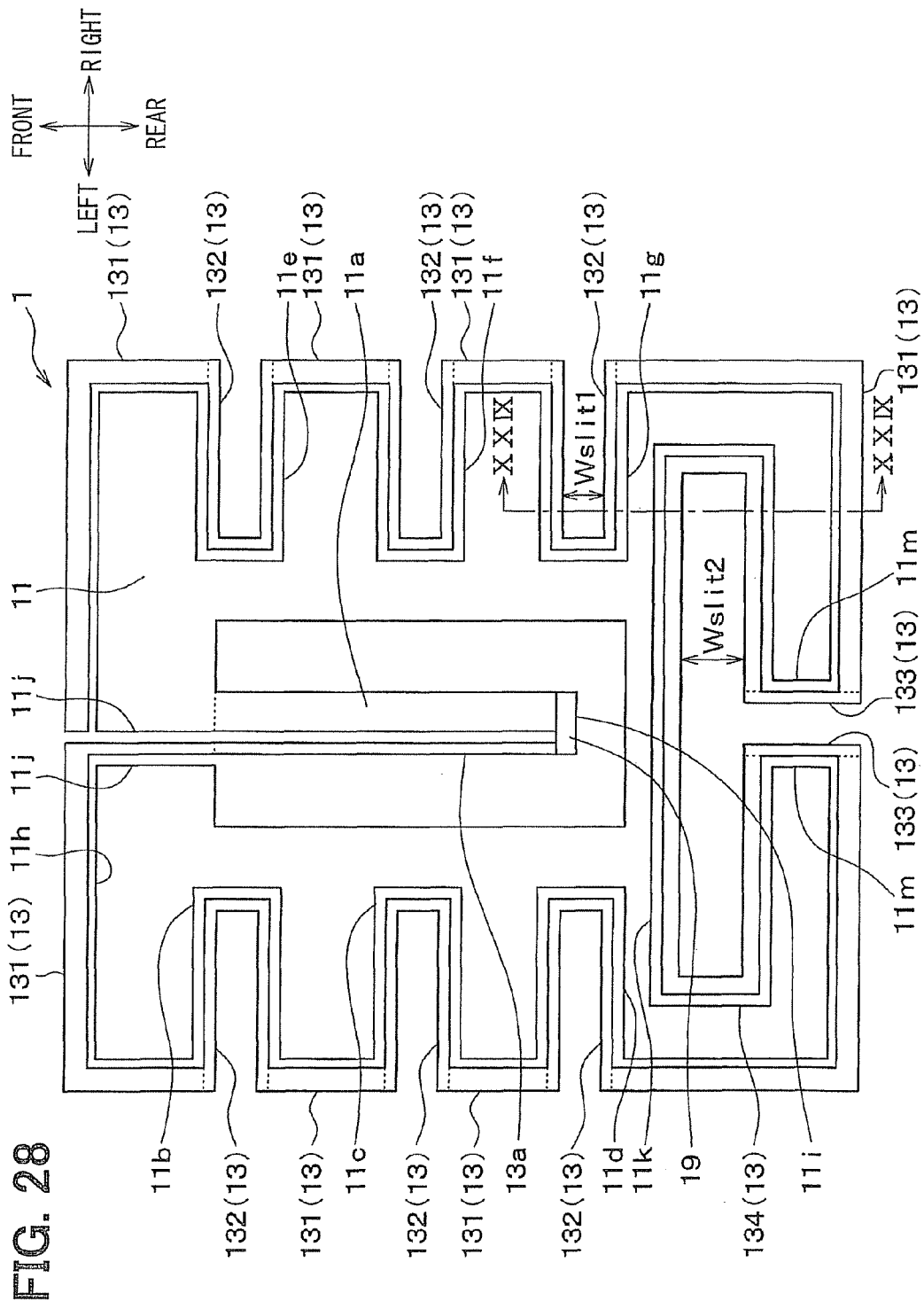
FIG. 28 is a diagram illustrating a configuration of a sensor unit of a fifth embodiment.
Figure 29:
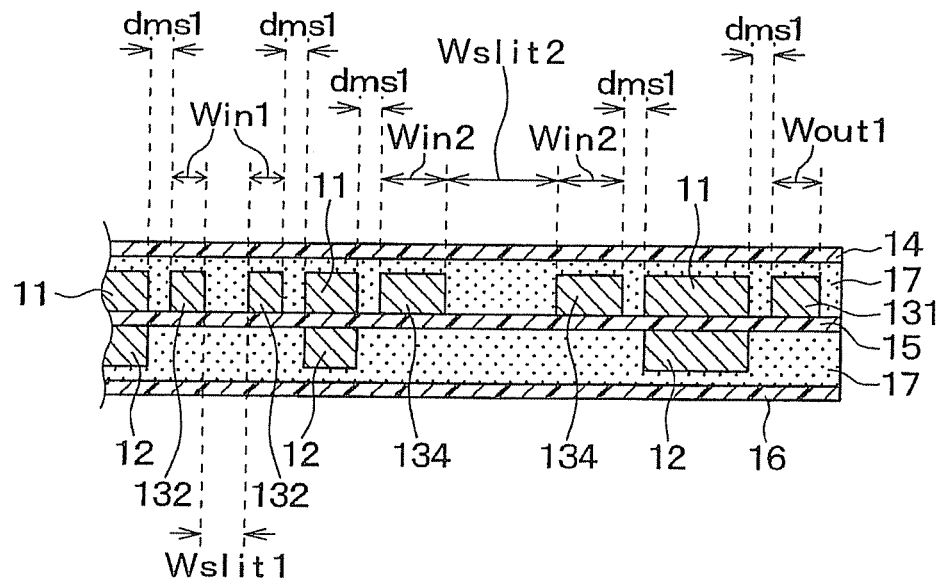
FIG. 29 is a cross sectional view of a sensor unit taken along line XXIX-XXIX in FIG. 28.

Now, a fifth embodiment will be described. The present embodiment is a modification of the fourth embodiment in a structure of the sensor unit 1. It should be noted that in operation of the present embodiment, electrostatic capacitance detection with the detection electrode detection electrode 11 is capacity detection in the occupant detection mode. Details of the structure of the sensor unit 1 of the present embodiment will be described with reference to FIG. 29 and FIG. 29. FIG. 28 is a diagram illustrating the sensor unit 1 in the same format as the FIG. 18. FIG. 29 is a cross-sectional view of the sensor unit 1 taken along line XXIX-XXIX in FIG. 28. In FIG. 28 to FIG. 29, width of the periphery guard wet electrode 13, width of the periphery guard wire portion 13a and the like are exaggerated from the actual size for purpose of improving the visibility.

The detection electrode 11 of the present embodiment is different from the detection electrode 11 of the fourth embodiment in that the detection electrode 11 of the present embodiment has another cutout on the seat rear side. More specifically, because of the cutout of the detection electrode 11 on the seat rear side, an inner edge 11k (this also corresponds to an example of depression portion) is formed inside the detection electrode 11. Additionally, a second connection portion 11m connecting the inner edge 11k and the outer edge 11h is formed. The width of the cutout between the second connection portions 11m (length in a left-to-right direction in FIG. 28) is smaller than a width of the cutout between the inner edge 11k (length in a left-to-right direction in FIG. 28).

The back surface guard electrode 12 has the same shape as the detection electrode 11. When viewed from the upper side of the sensor unit 1, the back surface guard electrode 12 is located to conform to and overlap with the detection electrode 11. The wire portions 11a, 12a, 13a are the same as those in the fourth embodiment.

As shown in FIG. 28, the stripe-shaped periphery guard wet electrode 13 is located apart from the detection electrode 11 so as to surround the outer edge 11h (the depression portions 11b to 11g and the outer shape portions) of the detection electrode 11. Additionally, with respect to the inner edge 11k also, the periphery guard wet electrode 13 is located along the inner edge 11k so as to have s shape similarity to the inner edge 11k. Furthermore, with respect to the second connection portion 11m also, the periphery guard wet electrode 13 is located along the second connection portion 11m.

As can be seen, the periphery guard wet electrode 13 includes multiple depression guard portions 132 located along the depression portions 11b to 11g of the detection electrode 11, an inner edge guard portion 134 (this also corresponds to an example of depression guard portion) located along the inner edge 11k, a connection guard portion 133 located along the second connection portion 11k, and multiple outer periphery guard portions 131 located along outer shape portions of the outer edge 11h. The outer shape portions are different from the depression portions 11b to 11g of the outer edge 11h, the inner edge 11k, and the second connection portion 11m. In FIG. 28, the dotted line shows a hypothetical boarder between the connection guard portion 133 and the inner edge guard portion 134. Throughout the connection guard portion 133, its width is the same. Throughout the inner edge guard portion 134, its width is the same.

As shown in FIG. 29, the width of the depression guard portion 132 is denoted by "Win1". The width of the inner edge guard portion 134 is denoted by "Win2". The width "Win1" is the same throughout the inner edge guard portion 132. The width "Win2" is the same throughout the inner edge guard portion 134. In the present embodiment, the clearance "dms1" between the detection electrode 11 and the periphery guard wet electrode 13 is the same anywhere Furthermore, in the present embodiment, the cutout width "Wslit1" of the depression portion 11b to 11g and the cutout width "Wslit2" of the inner edge 11k are different values. The cutout width "Wslit1" of the depression portions 11b to 11g is as described in the fourth embodiment.

Since the cutting away from the detection electrode 11 forms the inner edge 11k and the space and since the periphery guard wet electrode 13 is placed in the space so as to be located along the inner edge 11k, an elongated empty space surrounded by the periphery guard wet electrode 13 is formed. A width of this, empty space in a direction perpendicular to the longitudinal direction of the empty space is the cutout width "Wslit2" of the inner edge 11k.

This width "Wslit2" is larger than the width "Wslit1. Correspondingly, the width "Win2" of the inner edge guard portion 134 is made larger than the width "Win1" of the depression guard portion 132.

This is because an approximated expression "Win1= $((Wslit1)/2)^{1/2}$" of the solid line in FIG. 22 is the same for "Win2" and "Wslit2". When the width of the depression guard portion 132 and the width of the inner edge guard portion 134 are made as small as possible while the advantage associated with the periphery guard electrode is being maintained to some extent, there arises a need to increase the width of the periphery guard wet electrode 13 with increasing cutout width.

For example, the width "Wslit1" may be 8 mm, the width "Wslit2" may be 30 mm, the width "Win1" may be 2 mm, and the width "Win2" may be 4 mm.

It should be noted that the control unit 2 of the present embodiment may have the same circuit configuration as that of the third embodiment. In this case, the periphery guard wet electrode 13 serves as the periphery guard electrode.

(Sixth Embodiment)

A sixth embodiment will be described below. The present embodiment is a modification of the fourth embodiment in a structure of the sensor unit 1. It should be noted that in operation of the present embodiment, the electrostatic capacity detection with the detection electrode detection electrode 11 is the capacity detection in the occupant detection mode.

Figure 31:
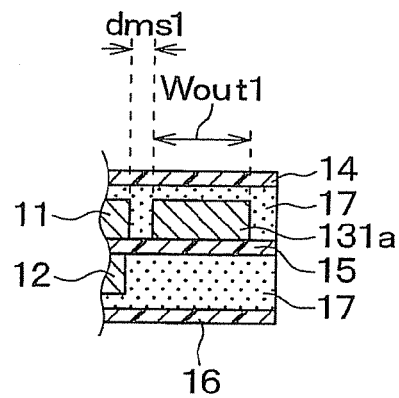
FIG. 31 is a cross sectional view of a sensor unit taken along line XXXI-XXXI in FIG. 30.
Figure 32:
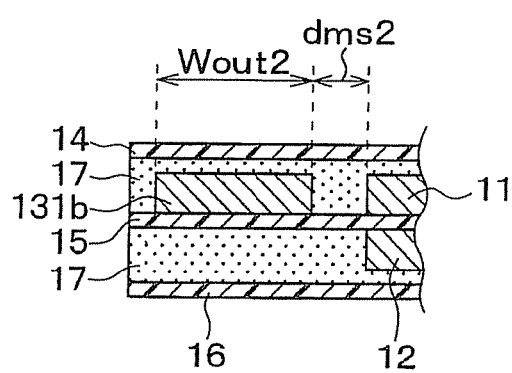
FIG. 32 is a cross sectional view of a sensor unit taken along line XXXII-XXXII in FIG. 30.
Figure 30:
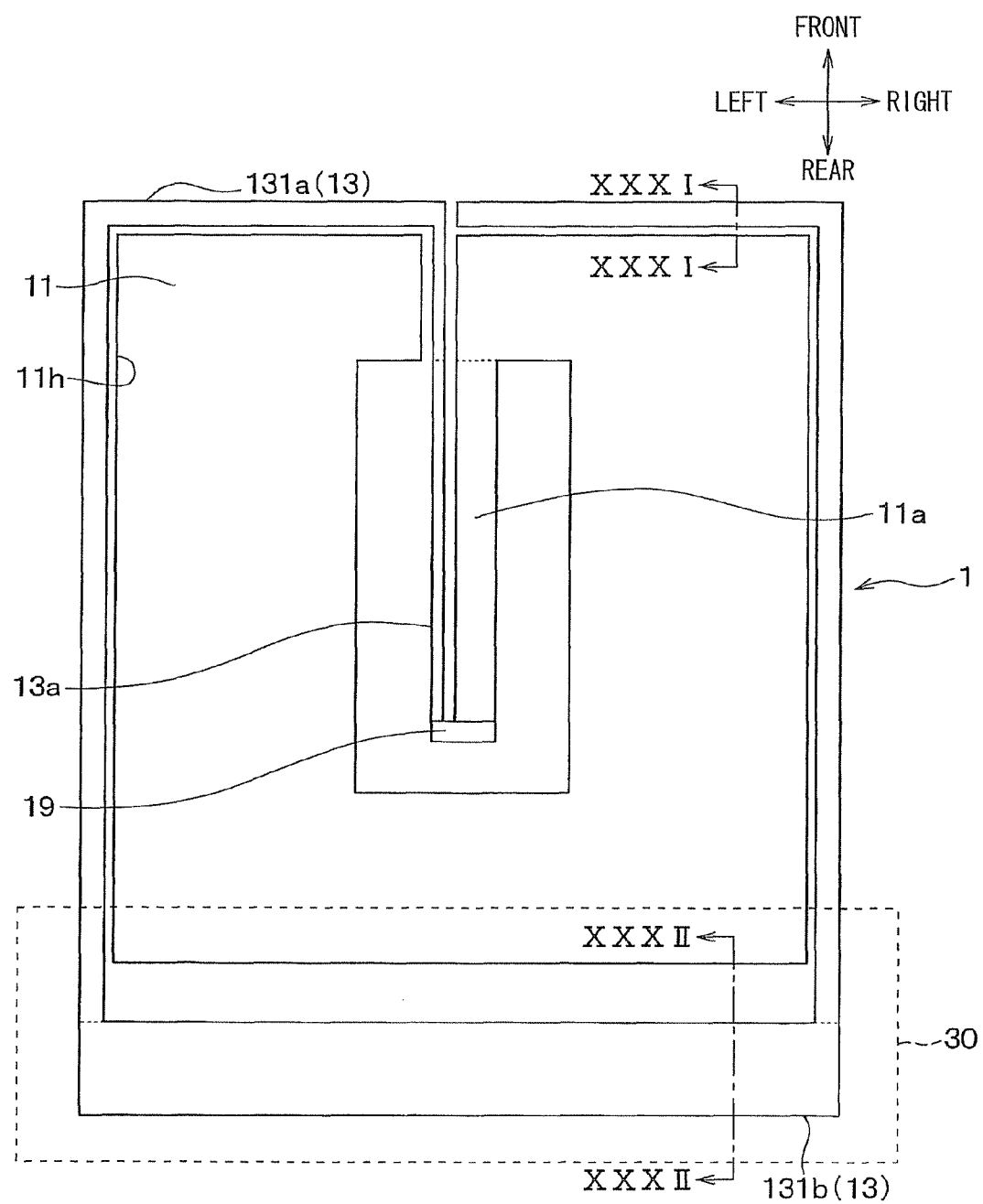
FIG. 30 is a diagram illustrating a configuration of a sensor unit of a sixth embodiment.

Details of the structure of the sensor unit 1 will be described with reference to FIG. 30, FIG. 30 and FIG. 32. FIG. 30 is a diagram illustrating the sensor unit 1 in the same format as the FIG. 18. FIG. 31 and FIG. 32 are cross-sectional views taken along line XXXI-XXXI and line XXXII-XXXII in FIG. 30, respectively. In FIG. 30 to FIG. 32, width of the periphery guard wet electrode 13, width of the periphery guard wire portion 13a and the like are exaggerated from their actual size for purpose of improving the visibility.

The detection electrode 11 of the present embodiment is different from the detection electrode 11 of the fourth embodiment in that the depression portions 11b to 11g are not formed. Hence, an outer edge shape of the detection electrode 11 is approximately quadrilateral. The back surface guard electrode 12 has the same shape as the detection electrode 11. When viewed from the upper side of the sensor unit 1, the back surface guard electrode 12 is located to conform to and overlap with the detection electrode 11. The wire portions 11a, 12a, 13a are the same as those in the fourth embodiment.

The periphery guard wet electrode 13 of the present embodiment includes a first outer periphery guard portion 131a and a second outer periphery guard portion 131b. The first outer periphery guard portion 131a is equally spaced apart from the detection electrode 11 by a clearance "dms1" (see FIG. 31) in the vicinity of a seat front side edge portion, a seat right side edge portion and a seat left side edge portion of the detection electrode 11. The second outer periphery guard portion 131b is equally spaced apart from the detection electrode 11 by a clearance "dms2" (see FIG. 31) in the vicinity of a seat rear side edge portion of the detection electrode 11. In FIG. 30, the dotted line shows a hypothetical boarder between the first outer periphery guard portion 131a and the second outer periphery guard portion 131b. The width "Wout1" of the first periphery guard portion 131a is the same anywhere. The width "Wout2" of the second periphery guard portion 131b is the same anywhere.

Now, explanation will be given on the clearance "dms1", "dms2", and the width "Wout1, "Wout2". In the present embodiment, the clearance "dms2" is larger than the clearance "dms1", and the width "Wout2" is larger than the width "Wout1". A reason why the above variation in the width of the periphery guard wet electrode 13 and the variation in the clearance between the detection electrode 11 and the periphery guard wet electrode 13 are position-dependent in the sensor unit 1 is to provide durability margin to a place where a stress from a seat is large. More specifically, the clearance between the electrodes 11 and 13 is enlarged in the place where the stress from the seat is large (e.g., a rear seat portion onto which an adult's hip is placed). Therefore, short-circuit between the electrodes due to degradation can be advantageously prevented. Furthermore, the width of the periphery guard wet electrode 13 is enlarged in the place where the stress from the seat is large. Therefore, rupture due to degradation can be advantageously prevented.

A reason for setting the clearance "dms1", "dms2" and the widths "Wout1", "Wout2" in the above way includes the following. As the clearance between the detection electrode 11 and the periphery guard wet electrode 13 is larger, the electric field generated by the detection electrode 11 tends to be directed largely away from the detection target. In view of this, the width of the periphery guard wet electrode 13 increases with increasing clearance between the detection electrode 11 and the periphery guard wet electrode 13, whereby the electric field directed largely away from the detection target can return to having a direction to the detection target. Therefore, it may be preferable that the width "Wout2" be larger than the width "Wout1" when the clearance "dms2" is larger than the clearance "dms1".

In the sensor unit 1 of the present embodiment, portions other than the portion surrounded by the dashed-line 30 in FIG. 30 can be replaced with a structure of equivalent portions of the sensor unit 1 of the fourth embodiment. Furthermore, the control unit 2 of the present embodiment may have the same circuit configuration as that of the third embodiment. In this case, the periphery guard wet electrode 13 serves as the periphery guard electrode.

(Seventh Embodiment)

A seventh embodiment will be described below. The present embodiment is a modification of the fourth embodiment in a structure of the sensor unit 1. A structure of the control unit 2 and an arrangement of the sensor unit 1 and the control unit 2 can be the same as those in the fourth embodiment. It should be noted that in operation of the present embodiment, the electrostatic capacity detection with the detection electrode detection electrode 11 is the capacity detection in the occupant detection mode.

Figure 33:
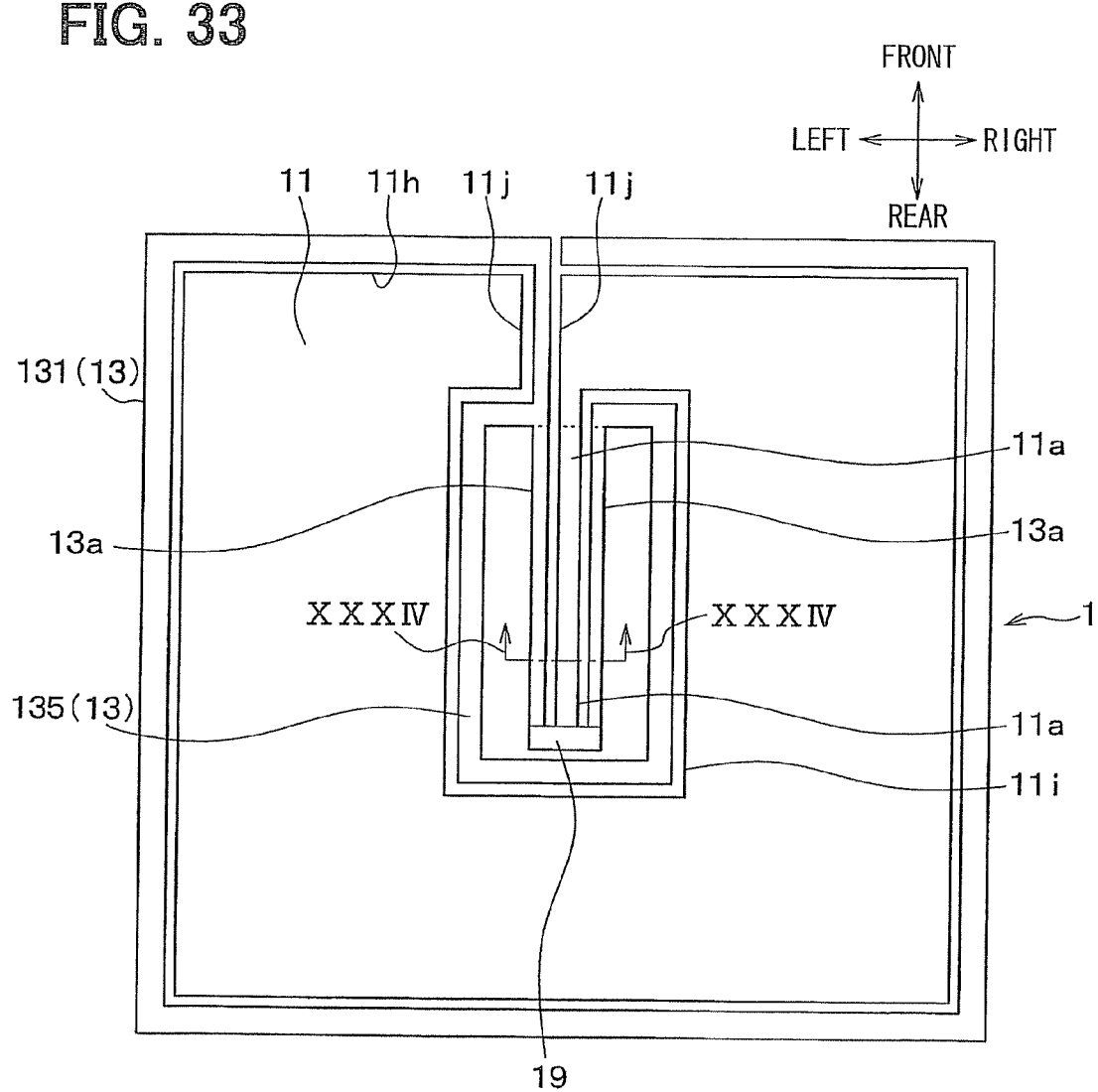
FIG. 33 is a diagram illustrating a configuration of a sensor unit of a seventh embodiment.
Figure 34:
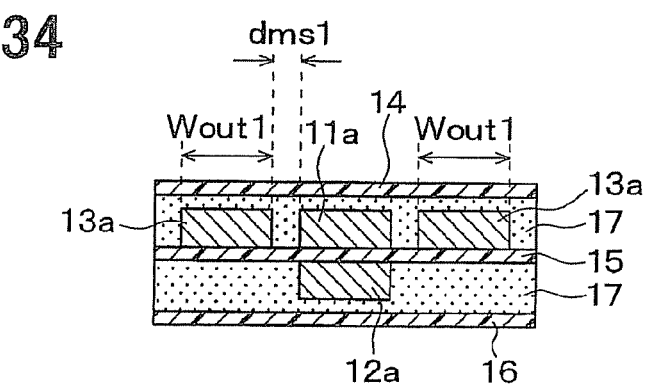
FIG. 34 is a cross sectional view of a sensor unit taken along line XXXIV-XXXIV in FIG. 33.

Details of the structure of the sensor unit 1 will be described with reference to FIG. 33 and FIG. 34. FIG. 33 is a diagram illustrating the sensor unit 1 in the same format as the FIG. 18. FIG. 34 is a cross sectional view of a sensor unit taken along line XXXIV-XXXIV in FIG. 33. In FIG. 33 and FIG. 34, the width of the periphery guard wet electrode 13, the width of the periphery guard wire portion 13a and the like are exaggerated from their actual size for purpose of improving the visibility.

The detection electrode 11 of the present embodiment is different from that of the fourth embodiment in that the depression portions 11b to 11g are not formed. Hence, an outer edge shape of the detection electrode 11 is approximately quadrilateral. The back surface guard electrode 12 has the same shape as the detection electrode 11. When viewed from the upper side of the sensor unit 1, the back surface guard electrode 12 is located to conform to and overlap with the detection electrode 11.

The periphery guard wet electrode 13 of the present embodiment includes a periphery guard portion 131, which is equally spaced apart from the detection electrode 11 by a clearance "dms1" (see FIG. 31) in the vicinity of a seat front side edge portion, a seat right side edge portion, a seat left side edge portion, and a seat rear side edge portion of the detection electrode 11. The periphery guard wet electrode 13 further includes an inner edge guard portion 135 (this also corresponds to an example of depression guard portion).

The inner edge guard portion 135 is made of the same material as and integrated with the outer periphery guard portion 131. The inner edge guard portion 135 extends from the periphery guard portion 131, extends along the vicinity of the connection portion 11j of the detection electrode 11 while being spaced apart from the connection portion 11j, and extends along the vicinity of the inner edge 11i of the detection electrode 11 while being spaced apart form the inner edge 11i by the clearance "dms1" (see FIG. 25). The inner edge guard portion 135 uniformly has the same width "Wout1" as the outer periphery guard portion 131. Alternatively, the inner edge guard portion 135 may have smaller width than the outer periphery guard portion 131.

Two outer periphery guard wire portions 13a extend from two places of the inner edge guard portions 135. These wire portions are made of the same material as and integrated with the inner edge guard portion 135, as shown in FIG. 33 and FIG. 34. These wire portions extend parallel to the detection electrode wire portion 11a so that the wire portions extend along the vicinity of both opposite sides of the detection electrode wire portion 11a while being spaced apart from the detection electrode wire portion 11a.

A stripe-shaped back surface guard wire portion 12a is made of the same material as and integrated with the back surface guard electrode 12. As is the case with the fourth embodiment, the back surface guard wire portion 12a extends parallel to the detection electrode wire portion 11a while being spaced apart from the detection electrode wire portion 11a. When the sensor unit 1 is viewed from the upper side, the back surface guard wire portion 12a is located to conform to and overlap with the detection electrode wire portion 11a.

As described in the fourth embodiment, the detection electrode wire portion 11a is made of the same material as and integrated with the detection electrode 11, as described above. This alone may lead to a capacitive coupling or a magnetic coupling to a surrounding conductive body in response to the electric signal application to the detection electrode wire portion 11a. Because of this, objects other than a detection target to be measured with the detection electrode of the sensor unit 1 may be measured, or, measurement noise may be generated, and as a result, sensing performance may degrade. Furthermore, when the detection electrode wire portion 11a has the movement freedom as described above, the detection electrode wire portion 11a may be coupled to the seat frame 3a or the like. The electrostatic capacitance due to the coupling varies according to movement of the detection electrode wire portion 11a and becomes a cause of detection value variation. More specifically, ideally, only the capacitance of the occupant is to detected with the detection electrode 11; however, the capacitance may be detected with the detection electrode wire portion 11a, and the determination performance may degrade.

In view of this, in the present embodiment, the back surface guard wire portion 12a and the two periphery guard wire portions 13a are located in the vicinity of the detection electrode wire portion 11a so as to extend side by side with the detection electrode wire portion 11a, as described above. More specifically, the back surface guard wire portion 12a extends parallel to the detection electrode wire portion 11a while being spaced apart from the detection electrode wire portion 11a. When the sensor unit 1 is viewed from the upper side, the back surface guard wire portion 12a is located to conform to and overlap with the detection electrode wire portion 11a. The periphery guard wire portions 13a extend parallel to the detection electrode wire portion 11a while being spaced from the detection electrode wire portion 11a. When the sensor unit 1 is viewed from the upper side, the periphery guard wire portions 13a are located on both opposite sides of the detection electrode wire portion 11a. That is, electrodes (i.e., the periphery guard wire portions 13a) having the same electric potential as the GND electrode or the detection electrode are arranged to run on both opposite sides of the detection electrode wire portion 11a so as to be parallel to the detection electrode wire portion 11a, whereby sensing performance reduction is suppressed.

According to the above structure, in the occupant detection mode, the main signal is applied to the detection electrode 11 through the detection electrode wire portion 11a, and at the same time, the periphery guard signal is applied to the periphery guard wet electrode 13 through the periphery guard wire portion 13a. Thus, the main signal and the periphery guard signal, respectively, are applied to the detection electrode wire portion 11a and the guard wire portion 13a at the same time. Furthermore, at the same time, the back surface guard signal is applied to the back surface guard wire portion 12a.

Therefore, it is possible to suppress a capacitive coupling between the detection electrode wire portion 11a and the ground (the vehicle body 3, the seat frame 3a or the like) and a capacitive coupling between the detection electrode wire portion 11a and the detection target (human body, CRS or the like). In this relation, because of the presence of the periphery guard wire portion 13a in the periphery in addition to the back surface guard wire portion 12a on the back surface side, it is possible to effectively suppress the capacitive coupling between the detection electrode wire portion 11a and the ground, and the capacitive coupling between the detection electrode wire portion 11a and the detection target. Furthermore, in contrast to the fourth embodiment, the periphery guard wire portion 13a is located not only one side of the detection electrode wire portion 11a but on both opposite sides of the detection electrode wire portion 11a. Therefore, it is possible to more efficiently suppress the capacitive coupling between the detection electrode wire portion 11a and the ground, and between the detection electrode wire portion 11a and the detection target.

In the present embodiment, portions of the sensor unit 1 (wire portions 11a, 12a, 13a, connector connection portion 19 etc.) other than a portion surrounded by the inner edge 11i can be replaced with a structure of equivalent portions of the sensor unit 1 of the fourth to sixth embodiment. Furthermore, the control unit 2 of the present embodiment may have the same circuit configuration as that of the third embodiment. In this case, the periphery guard wet electrode 13 serves as the periphery guard electrode.

(Eighth Embodiment)

An eighth embodiment will be described below. The present embodiment is a modification of the seventh embodiment in a structure of the sensor unit 1. An arrangement of the sensor unit 1 and the control unit 2, and operation of the capacitive occupant detection apparatus 10 are the same as those in the seventh embodiment. The control unit 2 has the same circuit configuration as that in the seventh embodiment, except for the below-described surface matters as to connection to the front surface guard wire portion 29. It should be noted that in operation of the present embodiment, the electrostatic capacity detection with the detection electrode detection electrode 11 is the capacity detection in the occupant detection mode.

Figure 35:
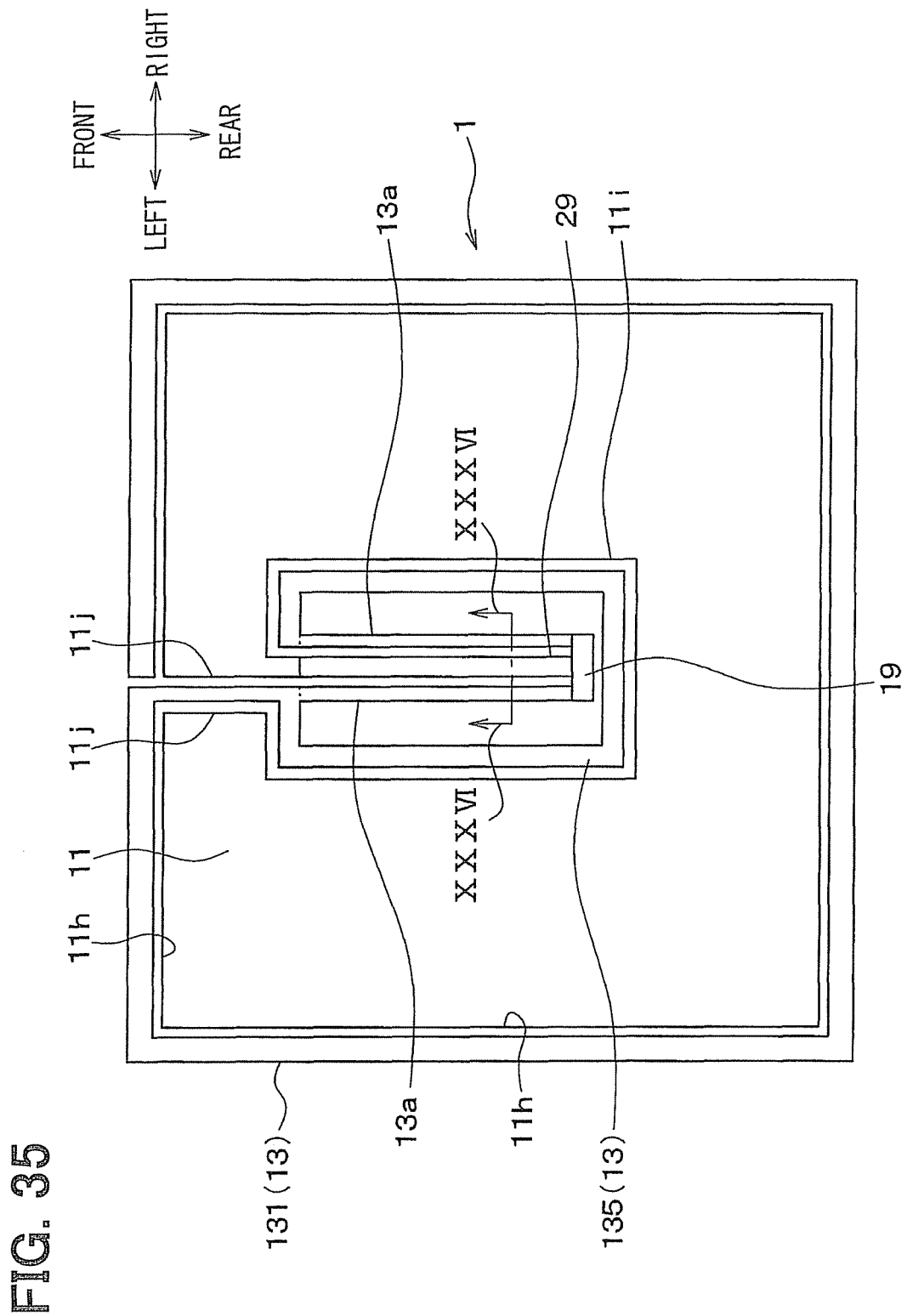
FIG. 35 is a diagram illustrating a configuration of a sensor unit of a eighth embodiment.
Figure 36:
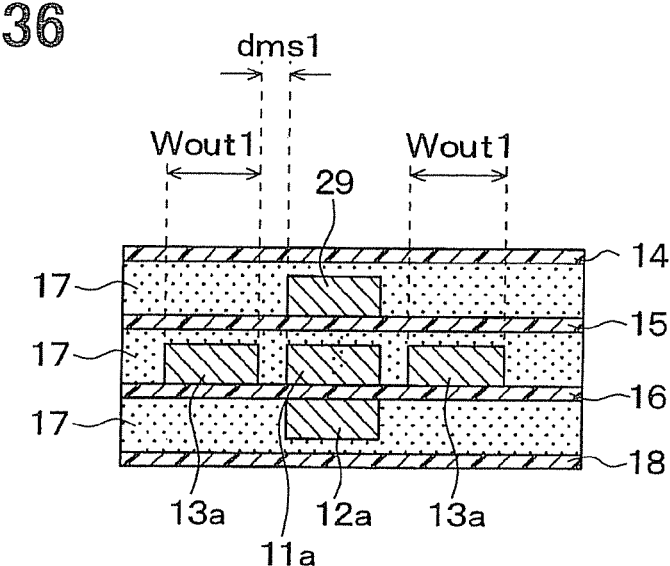
FIG. 36 is a cross sectional view of a sensor unit taken along line XXXVI-XXXVI in FIG. 35.
Figure 37A:
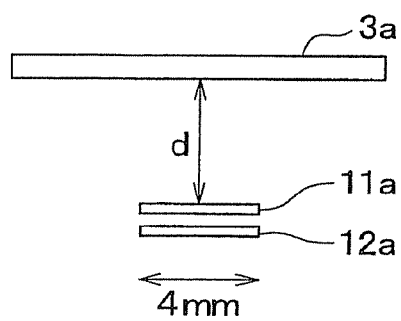
FIGS. 37A to 37D are diagrams schematically illustrating configurations (a) to (d) employed in simulations for comparison.
Figure 37B:
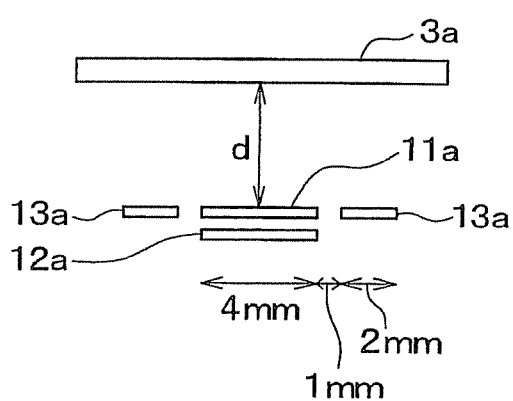
Figure 37C:
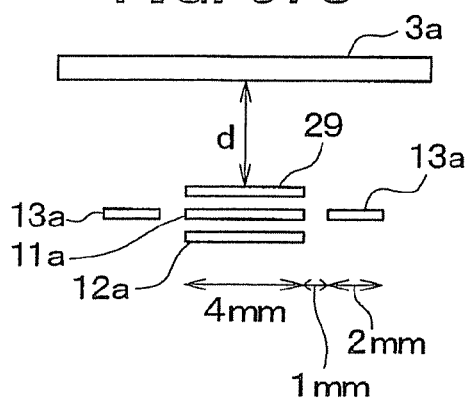
Figure 37D:
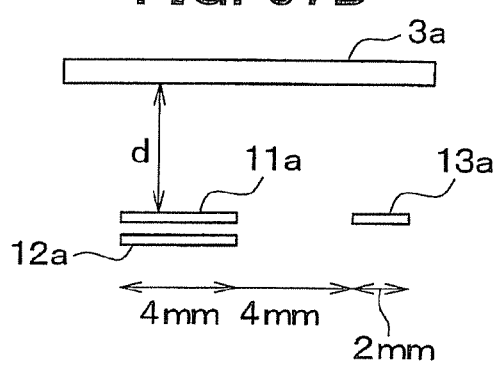

Details of the structure of the sensor unit 1 will be described with reference to FIG. 35 and FIG. 36. FIG. 35 is a diagram illustrating the sensor unit 1 in the same format as the FIG. 33. FIG. 36 is a cross-sectional view of the sensor unit 1 taken along line XXXVI-XXXVI in FIG. 35. In FIG. 35 and FIG. 36, the width of the periphery guard wet electrode 13, the width of the periphery guard wire portion 13a and the like are exaggerated from their actual size for purpose of improving the visibility.

More specifically, the sensor unit 1 of the present embodiment further includes a front surface guard wire portion 29, as compared with the sensor unit 1 of the seventh embodiment. The front surface guard wire portion 29 is a stripe-shaped electrode made of the same material as other wire portion 11a, 12a, 13a.

As shown in FIG. 35, when the sensor unit 1 is viewed from the upper side (from the detection target), the front surface guard wire portion 29 is located to conform to and overlap with the detection electrode wire portion 11a. As shown in FIG. 36, the front surface guard wire portion 29 is located on an upper side of the detection electrode wire portion 11a and located opposing the detection electrode wire portion 11a. To provide this arrangement, the front surface guard wire portion 29 is arranged in an uppermost layer (first layer), the back surface guard wire portion 12a is arranged in a lowermost layer (third layer), and the detection electrode wire portion 11a is arranged in a middle layer (second layer) in a three-layered structure, as shown in FIG. 36.

The front surface guard wire portion 29 is connected, through the connector connection portion 19, to a circuit inside the control unit 2. More specifically, for example, the front surface guard wire portion 29 may be connected to an output terminal of the guard potential usage operational amplifier 22 as is the case for the back surface guard electrode 12. Because of this, in the occupant detection mode, a guard signal having the same electric potential and phase as the back surface guard electrode 12 is applied to the front surface guard wire portion 29.

Therefore, in the occupant detection mode, the main signal is applied to the detection electrode 11 through the detection electrode wire portion 11a, and at the same time, the periphery guard signal is applied to the periphery guard wet electrode 13 through the periphery guard wire portion 13a, at the same time, the front surface signal is applied to the front surface guard wire portion 29. Therefore, the main signal and the periphery guard signal are applied at the same time to the detection electrode wire portion 11a and the periphery guard wire portion 13a. Furthermore, at the same time, the back surface guard signal and the front surface guard signal are applied to the back surface guard wire portion 12a and the front surface guard wire portion 29.

Because of the presence of this front surface guard wire portion 29, it is possible to more effectively suppress the capacitive coupling between the detection electrode wire portion 11a and the ground as compared with the seventh embodiment. In particular, it is possible to suppress the capacitive coupling between the detection electrode wire portion 11a and the seat frame 3a in cases where the detection electrode wire portion 11a is located below the seat frame 3a and the front surface guard wire portion 29 is located between the detection electrode wire portion 11a and the seat frame 3a.

In the present embodiment, portions of the sensor unit 1 (wire portions 11a, 12a, 13a, connector connection portion 19 etc.) other than a portion surrounded by the inner edge 11i can be replaced with the structure of the equivalent portions of the sensor unit 1 of the fourth to sixth embodiment. Furthermore, the control unit 2 of the present embodiment may have the same circuit configuration as that in the third embodiment. In this case, the periphery guard wet electrode 13 serves as the periphery guard electrode.

Now, a result of comparative simulation of capacitive coupling reduction by the guard wire portions 12a, 13a, 29 of the fourth embodiment, the seventh embodiment and the eighth embodiment is shown. Configurations (a) to (d) employed in simulations for comparison are schematically illustrated in FIGS. 37A to 37D, respectively. In these configurations (a) to (d), it is assumed that the detection electrode wire portion 11a having a width of 4 mm horizontally extends below the seat frame 3a.

In the configuration (a), away from the guard wire portions 12a, 13a, 29, only the back surface guard wire portion 12a with the width of 4 mm is located on the lower side of the detection electrode wire portion 11a. A clearance between the detection electrode wire portion 11a and the seat frame 3a is "d".

In the configuration (b), away from the guard wire portion 12a, 13a, 29, the back surface guard wire portion 12a with the width of 4 mm is located on the lower side of the detection electrode wire portion 11a. The periphery guard wire portions 13a each having a width of 2 mm are located on the left and right sides of the detection electrode wire portion 11a. A clearance between the detection electrode wire portion 11a and the periphery guard wire portion 13a is 1 mm. A clearance between the detection electrode wire portion 11a and the seat frame 3a is "d".

In the configuration (b), away from the guard wire portion 12a, 13a, 29, the back surface guard wire portion 12a with the width of 4 mm is located on the lower side of the detection electrode wire portion 11a. The periphery guard wire portions 13a each having a width of 2 mm are located on the left and right sides of the detection electrode wire portion 11a. A clearance between the detection electrode wire portion 11a and the periphery guard wire portion 13a is 1 mm. The front surface guard wire portion 29 having the width of 4 mm is located on the upper side of the detection electrode wire portion 11a. A clearance between the detection electrode wire portion 11a and the seat frame 3a is "d".

In the configuration (d), away from the guard wire portion 12a, 13a, 29, the back surface guard wire portion 12a with the width of 4 mm is located on the lower side of the detection electrode wire portion 11a. The periphery guard wire portion 13a having a width of 2 mm is located on one of the left and right sides of the detection electrode wire portion 11a. A clearance between the detection electrode wire portion 11a and the periphery guard wire portion 13a is 4 mm. A clearance between the detection electrode wire portion 11a and the seat frame 3a is "d".

Figure 38:
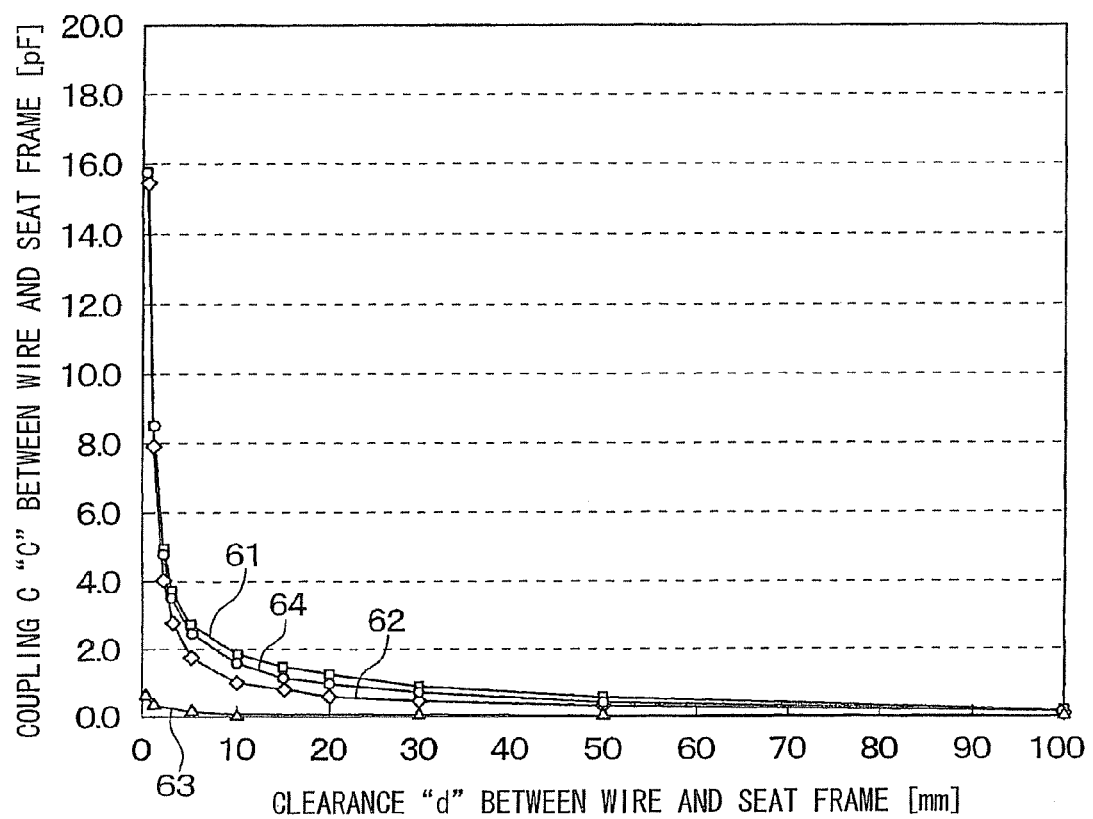
FIG. 38 is a graph of results of simulation of coupling capacitance between a detection electrode wire portion and a seat frame for multiple widths d.

For each of these configurations (a) to (d), FIG. 38 shows a result of simulation of the capacitive coupling between the detection electrode wire portion 11a and the seat frame 3a when the clearance "d" has multiple values. In FIG. 38, the solid line 61 shows the simulation result for the configuration (a), the solid line 62 shows the simulation result for the configuration (b), the solid line 63 shows the simulation result for the configuration (c), and the solid line 64 shows the simulation result for the configuration (d).

As can been seen, as shown in the configuration (b), when the guard wire portions 12a, 13a are constructed to run parallel to the detection electrode wire portion 11a, the capacitive coupling created by the detection electrode wire portion 11a can be reduced by 50% with respect to the configuration (a). Furthermore, as shown in the configuration (c), when the front surface guard wire portion 29 is present, the capacitive coupling can be reduced by 95% or more.

Figure 39:
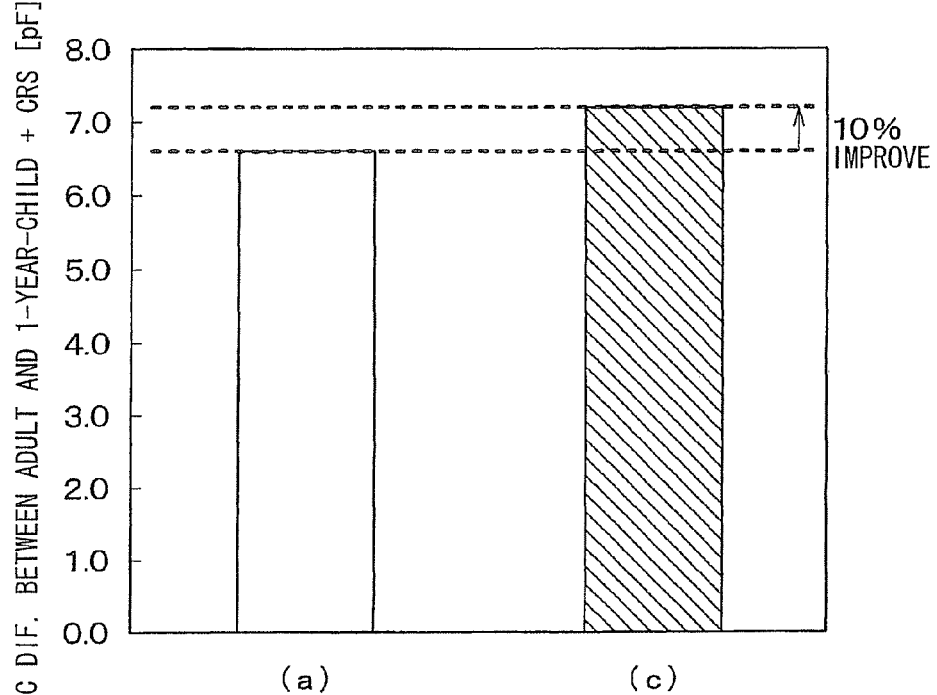
FIG. 39 is a graph illustrating a detected capacitance difference between adult and one-years-old child on a seat in cases where the configuration (a) and the configuration (b) are employed.

FIG. 39 shows, for the configuration (a) and the configuration (c), a result of evaluation of a detected capacitance difference, which relates to the determination performance, between the adult and the child on the CRS. A result is that the adoption of the configuration (c) achieves 10% improvement of the capacitance difference and facilitates accurate distinction between the adult and the one-years-old child on the CRS.

(Other Embodiments)

Although embodiments of the present invention have been described, it is to be understood that embodiments of the present invention are not limited to the above-described embodiments and cover other various embodiments. For example, the following embodiments can be covered.

(1) In the above third embodiment, the distinction between the electrode 11, which acts as the detection electrode, and the electrode 13, which acts as the guard electrode surrounding the detection electrode when viewed from the upper side of the seat base 30, is fixed in the sensor unit 1. However, this may not be always the case.

Figure 15:
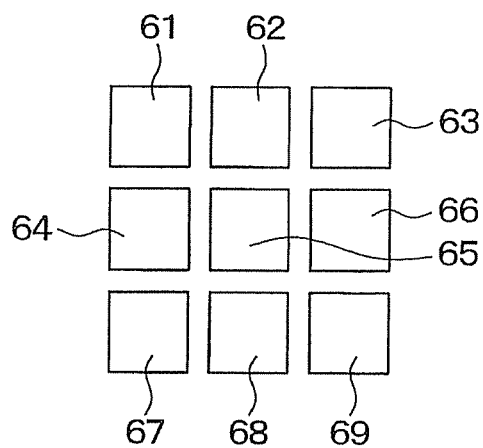
FIG. 15 is a diagram illustrating multiple electrodes serving as both of a detection electrode and a guard electrode.

For example, as shown in FIG. 15, the sensors unit 1 may include multiple upper side electrodes 61 to 69, which are arranged in a 3-by-3 tile form when viewed from the upper side of the seat base 30 (cf. JP-2004-123087). Just blow the upper side electrodes 61 to 69, the lower side electrodes (not shown) having the same shape and size as the corresponding upper side electrodes 61 to 69 are arranged apart from and opposing the corresponding upper side electrodes 61 to 69.

In this case, the control unit 2 may include changeover switches for respective upper side electrodes 61 to 69. When the changeover switch is in a state "A", the oscillation signal is applied from the signal application circuit 21 to the corresponding upper electrode, and additionally, the lower side electrode corresponding to the target upper side electrode is connected to the output terminal of the guard potential usage operational amplifier 22. When the changeover switch is in a state "B", the target upper side electrode is connected to the output terminal of the guard potential usage operational amplifier, and additionally, the lower side electrode corresponding to the target upper side electrode is opened and is not electrically connected to the back surface guard electrode.

In this case, in the occupant detection mode, the control circuit 24 may control the above changeover switches, so that respective pairs of the upper side electrode 61 to 69 and the corresponding lower side electrode act as the detection electrode and the back surface guard electrode in turn, and the current is detected with the signal detection circuit 23. In this way, it can be determined whether or not a human body exits above respective electrodes 61 to 69.

In this case, when one upper side electrode of the multiple upper side electrodes 61 to 69 is instructed to function as the detection electrode, the switch directed to this upper side electrode is switched into the state "A" and all of the switches directed to the other upper side electrodes are switched into the state "B". As a result, the other upper side electrodes function as the periphery guard electrodes.

In this manner, an upper side electrode functioning as the detection electrode and another upper side electrode functioning as the periphery guard electrode, which is located to surround the detection electrode when viewed from the upper side of the seat base 30, can be changed.

In this way, each of the upper side electrodes is used as the detection electrode (the electrode to which the oscillation signal is applied and to which the current to be detected is supplied) at one time and as the guard electrode at another time.

The electrodes 61 to 69 and the periphery guard wet electrode 13 of the first and second embodiments share a common function of acting as the periphery guard electrode at one time and acting as electrodes other than the guard electrode (e.g., the detection electrode, the wet electrode) at another time. Specifically, when the detection operation uses one of the upper side electrodes 61 to 69 as the detection electrode and does not use the rest of the upper side electrodes as the detection electrode, the guard signal (the signal having the same phase and electric potential as the oscillation signal applied to the detection electrode) is applied to the rest of the upper side electrodes. When a detection operation uses the rest of the upper side electrodes as the detection electrode, the reset of the upper side electrodes can be connected to a given circuit provided for detection.

(2) The first to third embodiments illustrate two kinds of arrangement of the detection electrode 11, the back surface guard electrode 12, the electrode 13 (periphery guard wet electrode or periphery guard electrode) in the sensor unit 1. However, these do not limit the arrangement of the electrodes 11 to 13.

Figure 16A:
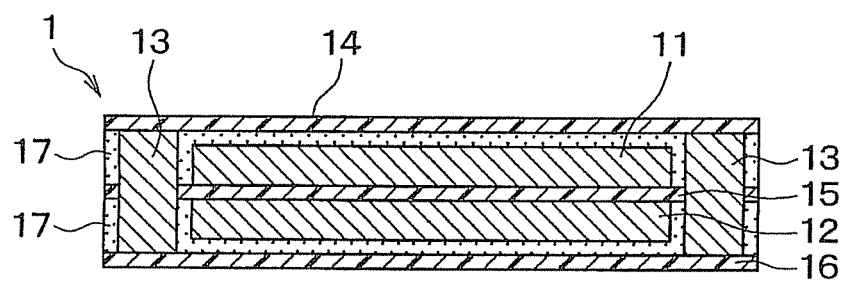
FIG. 16A and FIG. 16B are diagrams illustrating other examples of electrode arrangement.
Figure 16B:
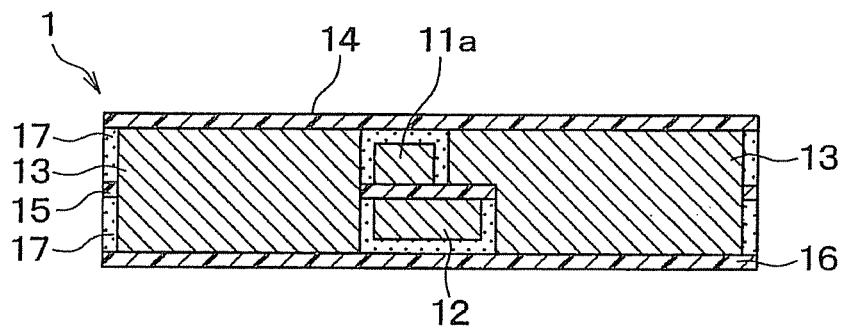

For example, such a sensor unit 1 as shown in FIGS. 10 to 13 in the second embodiment may be modified such that the cross sectional view taken along line IV-IV in FIG. 3 is changed from FIG. 4 to FIG. 16A and the cross sectional view taken along line V-V is changed from FIG. 5 to FIG. 16B. In this example, the electrode 13 is arranged like a wall surrounding the detection electrode 11 and the back surface guard electrode 12. Specifically, while the electrode 13 is being located to surround the detection electrode 11, the electrode 13 extends upward and downward more than the detection electrode 11 (i.e., extends along both of one direction (upward) and the other direction (downward) parallel to a thickness (upper and lower directions in FIGS. 16A and 16B) of the detection electrode 11). Because of this, the direct coupling between the detection electrode 11 and the vehicle body 3 can be more effectively suppressed.

(3) In the first to third embodiments, the shape of the detection electrode 11 is quadangular. However, the detection electrode 11 may not be quadangular. For example, as shown in FIG. 17, the quadangular shape may have a cutout or a hole therein.

Figure 17:
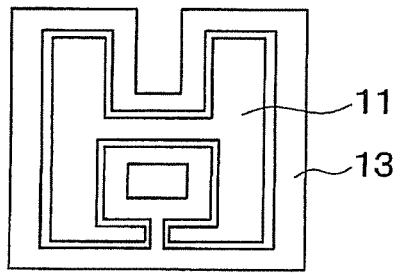
FIG. 17 is a diagram illustrating another electrode arrangement example.

In these cases, as shown in FIG. 17, the electrode 13 may be arranged to surround the electrode 11 so that the electrode 13 is located along a part or all of a convexo-concave portion, which is created by the cutout or the hole, of the outer edge of the electrode 11, This implements an arrangement of the electrode 13 according to the shape of the detection electrode 11.

(4) In the first embodiment, the detection electrode 11 and the periphery guard wet electrode 13 are arranged in the same layer. Moreover, the detection electrode wire portion 11a extending from the detection electrode 11 passes through the cut out of the frame-shaped periphery guard wet electrode 13 and extends toward the outside of the sensor unit 1.

However, even in cases where the detection electrode 11 and the periphery guard wet electrode 13 are arranged in the same layer, the frame shape of the periphery guard wet electrode 13 may not have the cutout. For example, the detection electrode wire portion 11a extending form the detection electrode 11 may pass under or over the periphery guard wet electrode 13 and extend toward the outside of the sensor unit 1. In this case, the detection electrode wire portion 11a may be located above or below the periphery guard wet electrode 13 in the same layer. Alternatively, through a through-hole, the detection electrode wire portion 11a may enter into a different layer, in which the periphery guard wet electrode 13 is not arranged, and may extend toward the outside of the sensor unit 1 while traveling in the different layer.

(5) The periphery guard wet electrode 13 and the back surface guard electrode 12, which are spaced apart from each other in the second embodiment, may be arranged in the same layer, and furthermore, may be formed as a single piece. In this case, although the back surface guard electrode 12 and the periphery guard wet electrode 13 function as a single guard electrode, a portion of the guard electrode protrudes into the surroundings of the detection electrode 11 when viewed from the upper side of the seat base 30, and this portion functions as the periphery guard electrode.

As a result, the prevention of the direct coupling between the detection electrode 11 and the vehicle body can be achieved. Not only that, the prevention of the direct coupling can be effectively improved by the amount corresponding to the non-separation between the back surface guard electrode 12 and the periphery guard wet electrode 13. Furthermore, the number of parts is reduced and the manufacturing cost is accordingly reduced, as compared with a case where the back surface guard electrode 12 and the periphery guard wet electrode 13 are formed as separated pieces.

(6) In the above embodiments, the guard potential usage operational amplifier 22, by which the signal having the same phase and electric potential as the oscillation signal applied to the detection electrode 11 is applied to the guard electrodes 12, 13, is an example of guard potential usage circuit. However, circuits other than the guard potential usage operational amplifier 22 can be employed as the guard potential usage circuit.

(7) In the above embodiments, in the occupant detection mode, the electrode 13 and the back surface guard electrode 12 are electrically connected to each other, so that the signal having the same phase and amplitude as the oscillation signal applied to the detection electrode 11 is applied to the periphery guard wet electrode 13 (or the periphery guard electrode 13). However, this may not be always the case.

For example, the capacitive occupant detection apparatus 10 may include a second guard potential usage operational amplifier functioning as a voltage follower. Like the guard potential usage operational amplifier 22, a + input terminal of the second guard potential usage operational amplifier may be connected to the signal line, which connects the signal application circuit 21 to the detection electrode 11. In the occupant detection mode, an output terminal of the second guard potential usage operational amplifier may be connected to the electrode 13. Because of this, without making an electrical connection between the electrode 13 and the back surface guard electrode 12, the signal having the same phase and electric potential signal as the oscillation signal applied to the detection electrode 11 is applied to the electrode 13.

(8) In the above embodiments, based on the current value or the like detected with the signal detection circuit 23, the control circuit 24 determines whether the occupant on the seat is an adult or a child on the CRS. However, it may be determine not only whether the occupant on the seat is an adult or a child on the CRS, but also whether the occupant on the seat is a 10-year-old child or a 1-year-old child on the CRS may be made. Furthermore, it may be determined whether the occupant seated on the seat is an adult or a child without use of the CRS. Furthermore, a determination of three states such as an adult on the seat, a child on the CRS on the seat, or no-one on the seat may be made. Furthermore, a determination of four states such as an adult on the seat, a child on the CRS, objects other than human being (e.g., baggage) on the seat, or no-one on the seated may be made. That is, the control circuit 24 determines a mounting state on the seat based on the current value or the like detected with the signal detection circuit 23.

(9) In the above embodiments, the control circuit 24 implements each function by executing a program. Alternatively, the functions may be implemented with use of hardware having these functions (e.g., FPGA, a circuit configuration of which is programmable).

(12) In the above embodiments, in the occupant detection mode, the control circuit 24 calculates the impedance from the detection electrode 11 to the vehicle body 3 from the voltage amplitude value, the current amplitude value and the phase difference between the current and the voltage based on the time-varying value of the current and the voltage (which includes voltage and current phase information) detected with the signal detection circuit 23 in the first state, and performs the occupant determination based on the imaginary part (electrostatic capacitance) of the calculated impedance However, this may not be always the case. For example, in the occupant detection mode, the control circuit 24 may detect the electrostatic capacitance based on the time-varying value of only one of the current or the voltage detected with the signal detection circuit 23 in the first state, and may perform the occupant determination based on the detected electrostatic capacitance.

(12) In the fourth and fifth embodiments, the periphery guard wet electrode 13 includes the depression guard portions 132 along the depression portions 11b to 11g and the inner edge guard portion 134 along the inner edge 11k. However, the periphery guard wet electrode 13 may not include these portions. For example, the periphery guard wet electrode 13 may have a quadrilateral frame shape along the quadrilateral outer shape of the detection electrode 11. Alternatively, the periphery guard wet electrode 13 may be constructed from only the periphery guard portion 131. Inversely, the periphery guard wet electrode 13 may not include the periphery guard portion 131 and may be constructed from only the depression guard portion 132 and the inner edge guard portion 134.

(13) The above embodiments may be configured such that: the back surface guard electrode 12 and the periphery guard wet electrode 13 are absent; only the back surface guard wire portion 12a and the periphery guard wire portion 13a are present; in occupant detection mode, the back surface guard signal and the periphery guard signal are applied to the back surface guard wire portion 12a and the periphery guard wire portion 13a, respectively. In this case also, the electrostatic capacity between the detection electrode wire portion 11a and the ground, or between the detection electrode wire portion 11a and the detection target can be advantageously reduced.

(14) In the embodiments, the place to which the sensor unit 1 is installed is not limited to the seat base. The place may be the backrest part of the seat or a portion of the ceiling of the vehicle above the seat.

(15) In the embodiments, the sensor unit 1 may not include the back surface guard electrode 12 and the back surface guard wire portion 12a.

The present disclosure has various aspects. For example, according to a first aspect of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes a detection electrode and a guard electrode. The guard electrode includes a periphery guard part. The control unit includes: a signal application circuit that applies a main signal to the detection electrode and applies a periphery guard signal to the periphery guard part; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The periphery guard part is located away from the detection electrode when the detection electrode is viewed from the detection target.

Since the periphery guard part located to surround the detection electrode is used as the guard electrode, it is possible to suppress a direct coupling between the detection electrode and a vehicle body, and as a result, it is possible to improve accuracy in determination as to the mounting state on the seat.

The above capacitive occupant detection apparatus may be configured as follows. The capacitive occupant detection apparatus further comprises: a changeover switch that is switched between a first state and a second state in accordance with control of the control circuit. In the first state, the periphery guard signal is applied to the periphery guard part. In the second state, the periphery guard signal is prohibited from being applied to the periphery guard part. While the changeover switch is in the first state, the control circuit determines the mounting state of the detection target on the seat based on the at least one value detected by the signal detection circuit in the first state. According the above configuration, by switching the changeover switch into the second state, it is possible to use the periphery guard electrode as other applications.

The above capacitive occupant detection apparatus may be configured as follows. The periphery guard part is provided as a periphery guard wet electrode. The capacitive occupant detection apparatus further comprises a changeover switch that is switched between a first state and a second state in accordance with control of the control circuit. In the first state, the periphery guard signal is applied to the periphery guard wet electrode. In the second state, the periphery guard wet electrode is grounded. In an occupant detection mode, the control circuit switches the changeover switch into the first state and determines the mounting state of the detection target on the seat based on the at least one value detected by the signal detection circuit in the first state. In a wetting detection mode, the control circuit switches the changeover switch into the second state and determines whether or not the seat has a wetting based on the at least one value detected by the signal detection circuit in the second state.

As described above, since the periphery guard wet electrode functions as a periphery guard electrode in the occupant detection mode and functions as a wet electrode in the wetting detection mode, the number of parts can be reduced and the positioning can be facilitated as compared with a case where a dedicated periphery guard electrode and a dedicated wet electrode are placed in the surrounding of the detection electrode.

The capacitive occupant detection apparatus may be configured as follows. The periphery guard part has a width of 4 mm or more and is shaped to surround the detection electrode. This improves the suppression of the direct coupling between the detection electrode and the vehicle body.

The above capacitive occupant detection apparatus may be configured as follows. When viewed from the detection target, the periphery guard part is located away from the detection electrode. The periphery guard part extends in both opposite directions along a thickness direction of the detection electrode. Because of this, it is possible to more effectively suppress the direct coupling between the detection electrode and the vehicle body.

The above capacitive occupant detection apparatus may be configured as follows. The detection electrode has a shape with a cutout or a shape with a hole therein. The periphery guard part, which surrounds the detection electrode, is located along a convexo-concave portion of an outer edge of the detection electrode. The concavo-convex portion is formed by the cutout or the hole. Because of this, an arrangement of the periphery guard part meeting the shape of the detection electrode can be achieved.

The above capacitive occupant detection apparatus may be configured as follows. The periphery guard signal is a signal having a same phase and a same electric potential as the main signal applied to the detection electrode.

The above capacitive occupant detection apparatus may be configured as follows. The guard electrode further includes a back surface guard part, which is located on a lower side of the detection electrode and located opposing the detection electrode. The control unit applies the main signal to the detection electrode and applies the periphery guard signal to the periphery guard part, and further applies a back surface guard signal to the back surface guard part.

The above capacitive occupant detection apparatus may be configured as follows. The back surface guard part and the periphery guard part, respectively, are as a back surface guard electrode and a periphery guard wet electrode located apart from each other.

The above capacitive occupant detection apparatus may be configured as follows. The back surface guard part and the periphery guard part are formed as a single piece.

According to this, the prevention of the direct coupling is improved by an amount corresponding to the non-separation between the rear surface guard part and the periphery guard part. Moreover, as compared with a case where the rear surface guard part and the periphery guard part are formed as separated pieces, the number of parts can be reduced and the manufacturing cost can be accordingly reduced.

The above capacitive occupant detection apparatus may be configured as follows. The back surface guard signal is a signal having a same phase and a same electric potential as the main signal applied to the detection electrode.

The above capacitive occupant detection apparatus may be configured as follows. The periphery guard part has a width of 5 mm or more, and has a shape surrounding the detection electrode.

According to this, since the capacitive coupling between the detection electrode and the ground is 115% or less of a convergence value at the infinitely-large width of the periphery guard part, the suppression of the direct coupling between the detection electrode and the vehicle body becomes significantly high.

The capacitive occupant detection apparatus may be configured as follows. The detection electrode has a depression portion, which is depressed with respect to an outer shape of the detection electrode. The periphery guard part includes an outer periphery guard portion extending along the detection electrode and a depression guard portion extending along the depression portion. Width of the outer periphery guard portion is larger than width of the depression guard portion. This facilitates determining whether an occupant is an adult or a child.

Alternatively, the above capacitive occupant detection apparatus may be configured as follows. The detection electrode has a depression portion, which is depressed with respect to an outer shape of the detection electrode. The periphery guard part includes an outer periphery guard portion extending along the detection electrode and a depression guard portion extending along the depression portion. The depression portion is formed by a cutout of the detection electrode. The depression guard portion is located in an space created by the cutout and is located along the depression portion, so that an elongated empty space is defined and surrounded by the periphery guard part. Width of the elongated empty space in a direction perpendicular to a longitudinal direction of the elongated empty space is a cutout width of the depression portion. As the cutout width is larger, width of a portion of the depression guard portion along the depression portion is larger.

This is because when the depression gaud portion has as small width as possible while maintaining, to some extent, an advantage of being the periphery guard electrode, the larger cutout width requires the larger width of the depression guard portion in consideration of the relation "Win= $((Wslist)/2)^{1/2}$".

The above capacitive occupant detection apparatus may be configured as follows. A clearance between the detection electrode and the periphery guard electrode varies from place to place in the sensor unit. Width of the periphery guard electrode becomes larger at places at which the clearance is larger.

When the clearance between the detection electrode and the periphery guard electrode is larger, the electric field generated from the detection electrode is easily bent in a direction largely away from the detection target. In view of this, when the periphery guard electrode has the larger width at the places at which the clearance is larger, the electric field largely away from the detection target can be returned in the direction toward the detection target.

According to a second aspect of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes: a detection electrode; a detection electrode wire portion serving as a wire through which the detection electrode and the control unit are connected to each other; and a periphery guard wire portion. The control unit includes: a signal application circuit that applies a main signal to the detection electrode through the detection electrode wire portion and applies a periphery guard signal to the periphery guard wire portion; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The periphery guard wire portion is located away from the detection electrode wire portion when the detection electrode is viewed from the detection target.

Since the periphery guard wire portion is located away from the detection electrode wire portion when the detection electrode is viewed from the detection target, it is possible to suppress a capacitive coupling between the detection electrode wire portion and the detection target or between the detection electrode wire portion and the ground.

The above capacitive occupant detection apparatus may be configured as follows. The periphery guard wire portion is located on both opposite sides of the detection electrode wire portion when the detection electrode is viewed from the detection target. This can further suppress the unwanted capacitive coupling.

According to a third aspect of the present disclosure, a capacitive occupant detection apparatus for determining a mounting state of a detection target on a seat can be configured and provided in the following way. The capacitive occupant detection apparatus comprises a sensor unit and a control unit connected to the sensor unit. The sensor unit includes: a detection electrode; a detection electrode wire portion serving as a wire through which the detection electrode and the control unit are connected to each other; a back surface guard electrode located on an opposite side of the detection electrode from the detection target and located opposing the detection electrode; and a front surface guard wire portion. The control unit includes: a signal application circuit that applies a main signal to the detection electrode through the detection electrode wire portion, applies a back surface guard signal to the back surface guard electrode and applies a front surface guard signal to the front surface guard wire portion; a signal detection circuit that detects at least one value of a current supplied to the detection electrode and a voltage supplied to the detection electrode at a time when the main signal is applied to the detection electrode; and a control circuit that determines the mounting state of the detection target on the seat based on the at least one value detected by the signal detection circuit. The front surface guard wire portion is located on an opposite side of the detection electrode from the back surface guard electrode and is located opposing the detection electrode wire portion.

According to the above configuration, since the front surface guard part located on the opposite side of the detection electrode from the rear surface guard electrode and located opposing the detection electrode wire portion is present, it is possible to suppress a capacitive coupling between the detection electrode wire portion and the detection target or between the detection electrode wire portion and the ground.

The above capacitive occupant detection apparatus may be configured as follows. The sensor unit further includes a back surface guard wire portion serving as a wire through which the back surface guard electrode and the control unit are connected to each other. In applying the back surface guard signal to the back surface guard electrode, the signal application circuit applies the back surface guard signal to the back surface guard electrode through the back surface guard wire portion. The back surface guard wire portion and the back surface guard electrode are located on a same side of the detection electrode, and the back surface guard wire portion is located opposing the detection electrode wire portion. Accordingly, the presence of the back surface guard wire portion enhances the suppression of the capacitive coupling between the detection electrode wire portion and the detection target, and between the detection electrode wire portion and the ground.

What is claimed is:

1. A capacitive occupant detection apparatus for determining a mounting state of a detection target on a seat, comprising:
    a sensor unit; and
    a control unit connected to the sensor unit,
    wherein:
    the sensor unit includes a detection electrode and a guard electrode;
    the guard electrode includes a periphery guard part;
    the control unit includes:
        a signal application circuit that applies a main signal to the detection electrode and applies a periphery guard signal to the periphery guard part;
        a signal detection circuit that detects at least one value of a current supplied to the detection electrode and a voltage supplied to the detection electrode at a time when the main signal is applied to the detection electrode; and
        a control circuit that determines the mounting state of the detection target on the seat based on the at least one value detected by the signal detection circuit; and
    the periphery guard part is located away from the detection electrode when the detection electrode is viewed from the detection target.

2. The capacitive occupant detection apparatus according to claim 1, further comprising:
    a changeover switch that is switched between a first state and a second state in accordance with control of the control circuit, wherein in the first state, the periphery guard signal is applied to the periphery guard part, wherein in the second state, the periphery guard signal is prohibited from being applied to the periphery guard part,
    wherein:
    while the changeover switch is in the first state, the control circuit determines the mounting state of the detection target on the seat based on the at least one value detected by the signal detection circuit in the first state.

3. The capacitive occupant detection apparatus according to claim 1, wherein the periphery guard part is provided as a periphery guard wet electrode,
    the capacitive occupant detection apparatus further comprising:
    a changeover switch that is switched between a first state and a second state in accordance with control of the control circuit, wherein in the first state, the periphery guard signal is applied to the periphery guard wet electrode, wherein in the second state, the periphery guard wet electrode is grounded,
    wherein, in an occupant detection mode, the control circuit switches the changeover switch into the first state and determines the mounting state of the detection target on the seat based on the at least one value detected by the signal detection circuit in the first state,
    wherein, in a wetting detection mode, the control circuit switches the changeover switch into the second state and determines whether or not the seat has a wetting based on the at least one value detected by the signal detection circuit in the second state.

4. The capacitive occupant detection apparatus according to claim 1, wherein:
    the periphery guard part has a width of 4 mm or more and is shaped to surround the detection electrode.

5. The capacitive occupant detection apparatus according to claim 1, wherein:
    when viewed from the detection target, the periphery guard part is located away from the detection electrode; and
    the periphery guard part extends in both opposite directions along a thickness direction of the detection electrode.

6. The capacitive occupant detection apparatus according to claim 1, wherein:
    the detection electrode has a shape with a cutout or a shape with a hole therein; and
    the periphery guard part, which surrounds the detection electrode, is located along a convexo-concave portion of an outer edge of the detection electrode, wherein the concavo-convex portion is formed by the cutout or the hole.

7. The capacitive occupant detection apparatus according to claim 1, wherein:
    the periphery guard signal has a same phase and a same electric potential as the main signal applied to the detection electrode.

8. The capacitive occupant detection apparatus according to claim 1, wherein:
    the guard electrode further includes a back surface guard part, which is located on a lower side of the detection electrode and located opposing the detection electrode; and
    the control unit applies the main signal to the detection electrode and applies the periphery guard signal to the periphery guard part, and further applies a back surface guard signal to the back surface guard part.

9. The capacitive occupant detection apparatus according to claim 1, wherein:
    the back surface guard part and the periphery guard part, respectively, are a back surface guard electrode and a periphery guard wet electrode located apart from each other.

10. The capacitive occupant detection apparatus according to claim 8, wherein:
the back surface guard part and the periphery guard part are formed as a single piece.

11. The capacitive occupant detection apparatus according to claim 8, wherein:
the back surface guard signal has a same phase and a same electric potential as the main signal applied to the detection electrode.

12. The capacitive occupant detection apparatus according to claim 1, wherein:
the periphery guard part has a width of 5 mm or more, and is shaped to surround the detection electrode.

13. The capacitive occupant detection apparatus according to claim 1, wherein:
the detection electrode has a depression portion, which is depressed with respect to an outer shape of the detection electrode;
the periphery guard part includes an outer periphery guard portion extending along the detection electrode and a depression guard portion extending along the depression portion; and
a width of the outer periphery guard portion is larger than width of the depression guard portion.

14. The capacitive occupant detection apparatus according to claim 1, wherein:
the detection electrode has a depression portion, which is depressed with respect to an outer shape of the detection electrode;
the periphery guard part includes an outer periphery guard portion extending along the detection electrode and a depression guard portion extending along the depression portion;
the depression portion is formed by a cutout of the detection electrode;
the depression guard portion is located in an space created by the cutout and is located along the depression portion, so that an elongated empty space is defined and surrounded by the periphery guard part;
a width of the elongated empty space in a direction perpendicular to a longitudinal direction of the elongated empty space is a cutout width of the depression portion; and
as the cutout width is larger, width of a portion of the depression guard portion along the depression portion is larger.

15. The capacitive occupant detection apparatus according to claim 1, wherein:
a clearance between the detection electrode and the periphery guard electrode varies from place to place in the sensor unit;
width of the periphery guard electrode becomes larger at places at which the clearance is larger.

16. A capacitive occupant detection apparatus for determining a mounting state of a detection target on a seat, comprising:
a sensor unit; and
a control unit connected to the sensor unit,
wherein:
the sensor unit includes:
a detection electrode;
a detection electrode wire portion that serves as a wire through which the detection electrode and the control unit are connected to each other; and
a periphery guard wire portion;
the control unit includes:
a signal application circuit that applies a main signal to the detection electrode through the detection electrode wire portion and applies a periphery guard signal to the periphery guard wire portion;
a signal detection circuit that detects at least one value of a current supplied to the detection electrode and a voltage supplied to the detection electrode at a time when the main signal is applied to the detection electrode; and
a control circuit that determines the mounting state of the detection target on the seat based on the at least one value detected by the signal detection circuit; and
the periphery guard wire portion is located away from the detection electrode wire portion when the detection electrode is viewed from the detection target.

17. The capacitive occupant detection apparatus according to claim 16, wherein
the periphery guard wire portion is located on both opposite sides of the detection electrode wire portion when the detection electrode is viewed from the detection target.

18. A capacitive occupant detection apparatus for determining a mounting state of a detection target on a seat, comprising:
a sensor unit; and
a control unit connected to the sensor unit,
wherein:
the sensor unit includes:
a detection electrode;
a detection electrode wire portion that serves as a wire through which the detection electrode and the control unit are connected to each other;
a back surface guard electrode that is located on an opposite side of the detection electrode from the detection target and opposes the detection electrode; and
a front surface guard wire portion;
the control unit includes:
a signal application circuit that applies a main signal to the detection electrode through the detection electrode wire portion, applies a back surface guard signal to the back surface guard electrode and applies a front surface guard signal to the front surface guard wire portion;
a signal detection circuit that detects at least one value of a current supplied to the detection electrode and a voltage supplied to the detection electrode at a time when the main signal is applied to the detection electrode; and
a control circuit that determines the mounting state of the detection target on the seat based on the at least one value detected by the signal detection circuit; and
the front surface guard wire portion is located on an opposite side of the detection electrode from the back surface guard electrode and is located opposing the detection electrode wire portion.

19. The capacitive occupant detection apparatus according to claim 18, wherein:
the sensor unit further includes
a back surface guard wire portion serving as a wire through which the back surface guard electrode and the control unit are connected to each other;
in applying the back surface guard signal to the back surface guard electrode, the signal application circuit applies the back surface guard signal to the back surface guard electrode through the back surface guard wire portion; and the back surface guard wire portion and the back surface guard electrode are located on a same side of the detection electrode, and the back surface guard wire portion is located opposing the detection electrode wire portion.

\* \* \* \* \*